(12) United States Patent
Madurawe

(10) Patent No.: US 8,230,375 B2
(45) Date of Patent: Jul. 24, 2012

(54) AUTOMATED METAL PATTERN GENERATION FOR INTEGRATED CIRCUITS

(76) Inventor: Raminda Udaya Madurawe, Sunnyvale, CA (US)

( * ) Notice: Subject to any disclaimer, the term of this patent is extended or adjusted under 35 U.S.C. 154(b) by 703 days.

(21) Appl. No.: 12/210,212

(22) Filed: Sep. 14, 2008

(65) Prior Publication Data

US 2010/0070942 A1 Mar. 18, 2010

(51) Int. Cl.
*G06F 17/50* (2006.01)
(52) U.S. Cl. ........................................... 716/117
(58) Field of Classification Search ............... 716/117
See application file for complete search history.

(56) References Cited

U.S. PATENT DOCUMENTS

| | | | |
|---|---|---|---|
| 5,781,031 A | 7/1998 | Bertin | |
| 6,211,697 B1 * | 4/2001 | Lien et al. | 326/41 |
| 7,093,225 B2 * | 8/2006 | Osann, Jr. | 438/129 |
| 2004/0178819 A1 | 9/2004 | New | |
| 2006/0195729 A1 | 8/2006 | Huppenthal | |

OTHER PUBLICATIONS

Chen Dong et al., "3-D nFPGA: A reconfigurable architecture for 3-D CMOS/Nanomaterial Hybrid Digital Circuits", IEEE Trans. Circuits and Systems, vol. 54, No. 11, Nov. 1, 2007 (pp. 2489-2501).
PCT International Search Report; Application No. PCT/US2008/063483; Dated May 13, 2008; Applicant Viciciv.
Notification of Transmittal of International Search Report; Application No. PCT/US2008/063483; Dated Mar. 26, 2009; Applicant Viciciv.
Written Opinion of the International Searching Authority; Application No. PCT/US2008/063483; Dated May 13, 2008; Applicant Viciciv Technology, Inc.

* cited by examiner

*Primary Examiner* — Jack Chiang
*Assistant Examiner* — Brandon Bowers

(57) ABSTRACT

An integrated circuit fabricated by a mask set including a mask to generate a metal pattern defined by CAD software, the metal pattern generation method including: reading a binary data set, the data points in the set uniquely matched to a plurality of fixed metal tabs; and selecting a metal tab from a first set of selectable metal tabs for a first data value, or a second set of selectable metal tabs for a second data value for each of the fixed metal tabs; wherein a first set metal tab and a second set metal tab couples each said fixed metal tab to first and second voltages respectively.

20 Claims, 13 Drawing Sheets

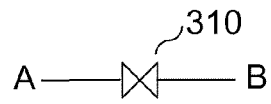
Fig-3A
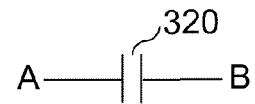
Fig-3B
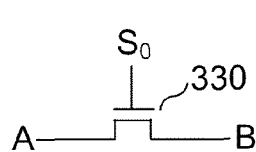
Fig-3C
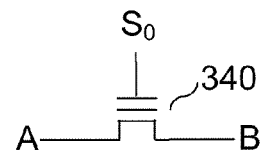
Fig-3D
Fig-3 (Related Art)
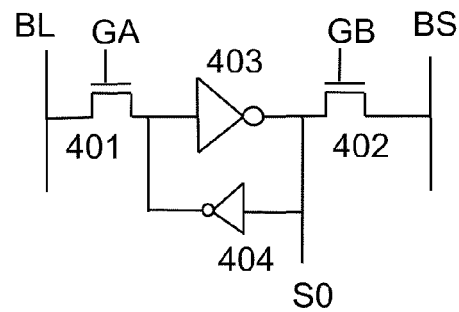
Fig-4A (Prior Art)
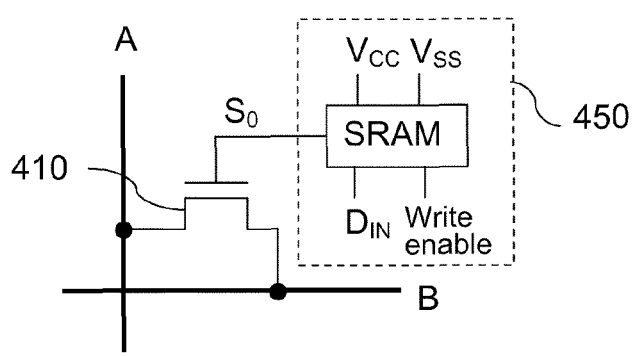
Fig-4B (Prior Art)
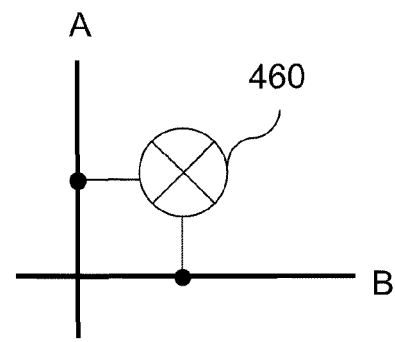
Fig-4C (Prior Art)

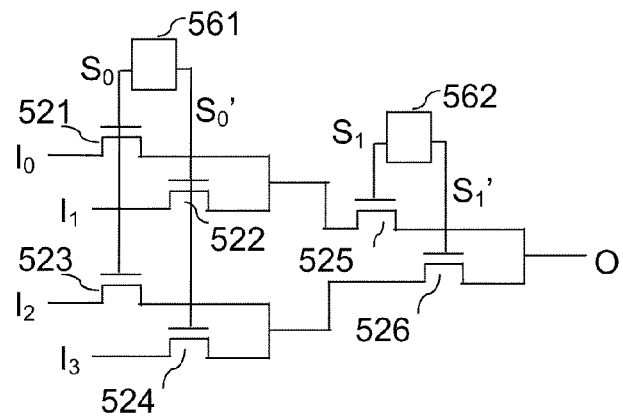
Fig-5B
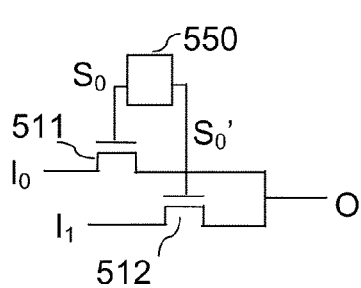
Fig-5A
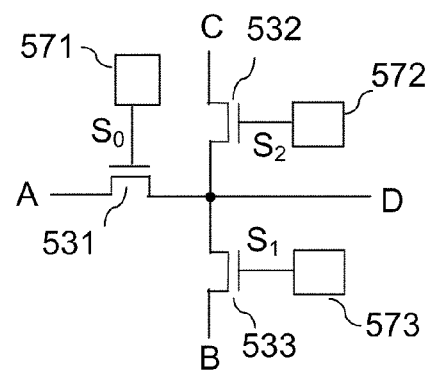
Fig-5C
Fig-5 (Prior Art)

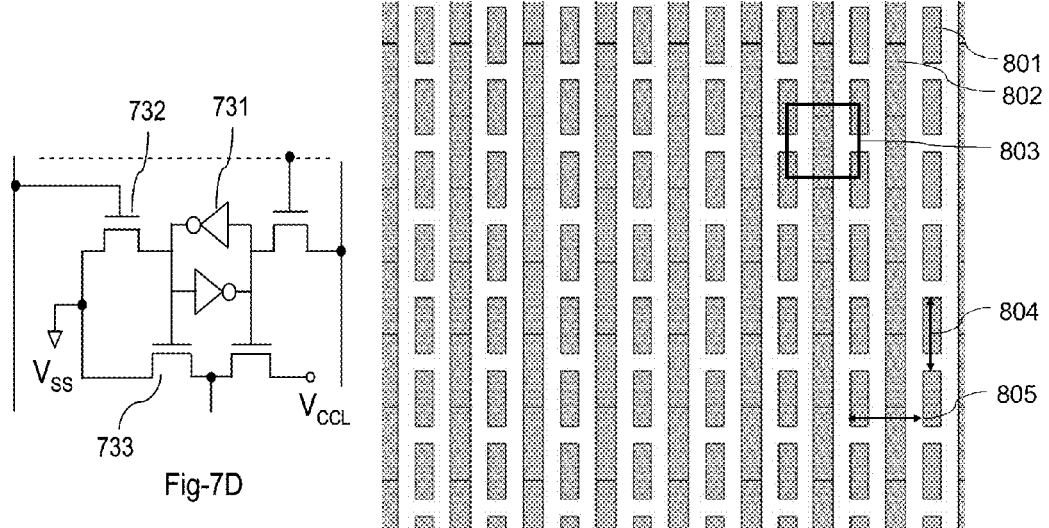
Fig-7D
Fig-8A
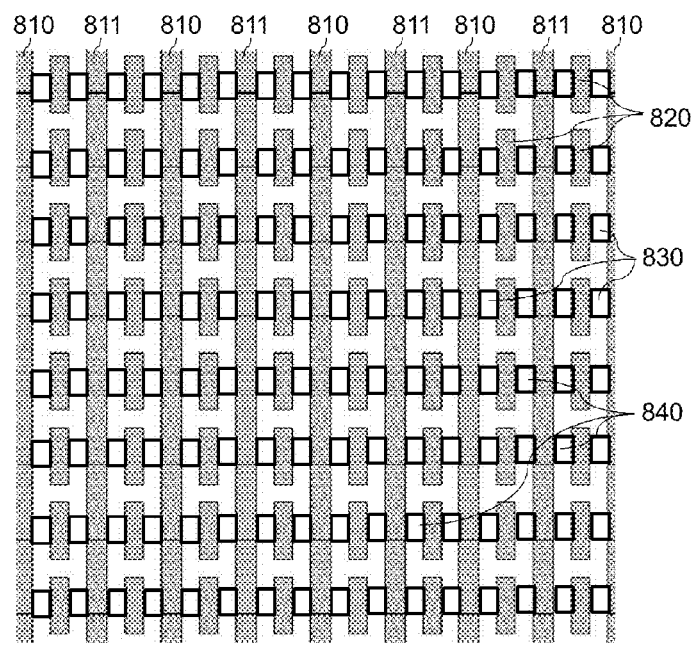
Fig-8B

AUTOMATED METAL PATTERN GENERATION FOR INTEGRATED CIRCUITS

BACKGROUND

The present invention relates to devices and software related to programmable logic devices (FPGA/MPGA) and application specific integrated circuits (ASSP/ASIC).

Traditionally, integrated circuit (IC) devices such as custom, semi-custom, or application specific integrated circuit (ASIC) devices have been used in electronic products to reduce cost, enhance performance or meet space constraints. However, the design and fabrication of custom or semi-custom ICs can be time consuming and expensive. The customization involves a lengthy design cycle during the product definition phase and high Non Recurring Engineering (NRE) costs during manufacturing phase. To absorb design modifications or in the event of finding a logic error in the custom or semi-custom IC during final test phase, the design and fabrication cycles may have to be repeated. Lengthy emulation and prototyping cycles further aggravate the time to market and NRE costs. As a result, ASICs serve only specific applications and are custom built for high volume and low cost.

Another type of semi custom device called a Gate Array (includes Platform ASIC and Structured ASIC) customizes modular blocks at a reduced NRE cost by synthesizing the design using a software model similar to the ASIC. Structured ASICs provide a larger modular block compared to Gate Arrays, and may or may not provide pre instituted clock networks to simplify the design effort. In both, a software tool has to undergo a tedious iteration between a trial placement and ensuing wire "RC" extraction for timing closure. In submicron process technologies, wire "RC" delays are very complex and difficult to predict. The missing silicon level design verification Gate Arrays result in multiple spins and lengthy design iterations, further exacerbating a quick design solution. Most users need the iterative tweaking of designs to perfect their design.

In recent years there has been a move away from custom or semi-custom ICs toward field programmable components whose function is determined not when the integrated circuit is fabricated, but by an end user "in the field" prior to use. Off the shelf, generic Programmable Logic Device (PLD) or Field Programmable Gate Array (FPGA) products greatly simplify the design cycle. These products offer user-friendly software to fit custom logic into the device through programmability, and the capability to tweak and optimize designs to improve silicon performance. As the wire "RC" delays are pre-characterized, the users are able to achieve complex placements and timing closures very quickly and very accurately. The flexibility of this programmability or alterability is expensive in terms of silicon real estate, but reduces design cycle and upfront NRE cost to the designer. In this disclosure the terms FPGA and PLD are used interchangeably to mean programmable devices.

FPGAs (includes PLDs) offer the advantages of low non-recurring engineering costs, fast turn around (designs can be placed and routed on an FPGA in typically a few minutes to few hours), and low risk since designs can be easily amended late in the product design cycle. It is only for high volume production runs that there is a cost benefit in using the more traditional ASIC approaches. Compared to PLD and FPGA, an ASIC has hard-wired logic connections, identified during the chip design phase. ASIC has no multiple logic choices, no multiple routing choices and no configuration memory to customize logic and routing. This is a large chip area and cost saving for the ASIC—the FPGA silicon area may be 10 to 40 times the ASIC area due to these programmable overheads. Smaller ASIC die sizes lead to better performance and better reliability. A full custom ASIC also has customized logic functions which may require fewer gates compared to PLD and FPGA implementations of the same logic functions. Thus, an ASIC is significantly smaller, faster, cheaper and more reliable than an equivalent gate-count FPGA. The trade-off is between time-to-market (FPGA advantage) versus low cost and better reliability (ASIC advantage). The cost of Silicon real estate for programmability provided by the FPGA compared to ASIC determines the extra cost the user has to bear for customer re-configurability of logic functions and routing between logic modules. Programmability includes configuration memory and MUX overhead in FPGAs.

The 10 to 40× silicon area disadvantage lead to significant cost and performance disparity between the ASIC and the FPGA. A significant portion of silicon real estate overhead is consumed by the programmable interconnects in an FPGA (including associated configuration memory). Removing routing to reduce silicon overhead makes an FPGA unusable. A 3D FPGA with better logic gate silicon density improvement over 2D FPGA has been disclosed in the IDS references, especially in application Ser. Nos. 10/267,483, 10/267,484 and 10/267,511. Such techniques may reduce the ratio of FPGA to ASIC logic gate silicon area ratio to 2 to 10 times. Reducing the FPGA logic area penalty improves the value of FPGA compared to ASIC. When the Si area ratio reaches a threshold (the threshold determined by the life-time volume needs of the device), it would eliminate the need for ASIC designs, and the FPGA design will become the new standard for system design.

A complex logic design is broken down to smaller logic blocks and programmed into logic elements or logic blocks provided in the FPGA. Logic elements offer sequential and combinational logic design implementations. Combinational logic has no memory and outputs reflect a function solely of present inputs. Sequential logic is implemented by inserting memory into the logic path to store past history. Current FPGA architectures include transistor pairs, NAND or OR gates, multiplexers, look-up-tables (LUTs) and AND-OR structures as a basic logic element. In a conventional FPGA, the basic logic element is labeled a macro-cell. Hereafter the terminology logic element will include logic elements, macro-cells, arithmetic logic units and any other basic logical unit used to implement a portion of a logic function. Granularity of a FPGA refers to logic content (small or large) of a basic logic element. The complex logic design is broken down to fit the custom FPGA grain. In fine-grain architectures, a small basic logic element is enclosed in a routing matrix and replicated. These offer easy logic fitting at the expense of complex routing. In course-grain architectures, many basic logic elements are wrapped with local routing into a logic block with larger functionality, which is then replicated. The logic block replication utilizes a global routing technique. Larger logic blocks make the logic fitting difficult and the routing easier. A challenge for FPGA architectures is to provide easy logic fitting (like fine-grain) and maintain easy routing (like course-grain).

Inputs and outputs for the Logic Element, Logic Unit or Logic Block are selected from the programmable Routing Matrix. A routing wire is dedicated to each. An exemplary routing matrix containing logic elements described in Ref-1 (Seals & Whapshott) is shown in FIG. 1. In that example, the inputs and outputs from Logic Element 101-104 are routed to 22 horizontal and 12 vertical interconnect wires with programmable via connections. These connections may be fuses, anti-fuses or SRAM controlled pass-gate transistors comprising a Connect state and a Disconnect state. One output of element 101 is shown coupled to one of the inputs to element 104 in darker lines: in that vertical wire #3 is used to complete the coupling. One output of element 103 is also shown coupled to one of the inputs to element 104 in darker lines: in that vertical wire #8 is used to complete the coupling. Thus every input and every output occupies one or more dedicated wires to complete the coupling. Thus the number wires, wire segments, programmable connection, and Si area required for the connectivity grows rapidly with the number of logic elements N within the fabric.

The logic element having a built in D-flip-flop used with FIG. 1 routing as described in Ref-1 is shown in FIG. 2. In that, elements 201, 202 and 203 are 2:1 MUX's controlled by one input signal each. Element 204 is an OR gate while 205 is a D-Flip-Flop. Without global Preset & Clear signals, eight inputs feed the logic block, and one output leaves the logic block. These 9 wires are shown in FIG. 1 with programmable connectivity. Thus 9 wires must be assigned to connect the logic element shown in FIG. 2. All 2-input, all 3-input and some 4-input variable functions are realized in the logic block and latched to the D-Flip-Flop. FPGA architectures for various commercially available devices are discussed in Ref-1 (Seals & Whapshott) as well as Ref-2 (Sharma). A comprehensive thesis on FPGA routing architecture is provides in Ref-3 (Betz, Rose & Marquardt) and Ref-4 (Lemieux & Lewis).

Routing block wire structure defines how logic blocks are connected to each other. Adjacent logic elements as well as die opposite corner logic elements may require connections. Wire signals are driven by output buffers attached to logic elements, and the drive strength does not change on account of wire length. Longer wires may require repeaters to rejuvenate the signals periodically. Buffers and repeaters consume a large Si area and are very expensive. The wire delays become unpredictable as the wire lengths are randomly chosen during the Logic Optimization to best fit the design into a given FPGA. FPGA's also incur lengthy run times during timing driven optimization of partitioned logic. As FPGA's grow bigger in die size, the number of wire segments and wire lengths to connect logic increase. Wire delays can dominate chip performance. Wire delays grow proportional to square of the wire length, and inverse distance to neighboring wires. Maximum chip sizes remain constant at mask dimension of about 2 cm per side, while metal wire spacing is reduced with technology scaling. A good timing optimization requires in depth knowledge of the specific FPGA fitter, the length of wires segments, and relevant process parameters; a skill not found within the design house doing the fitting. In segmented wire architectures, expensive fixed buffers are provided to drive global signals on selected lines. These buffers are too few as they are too expensive, and only offer unidirectional data flow. Predictable timing is another challenge for FPGA's. This would enhance place and route tool capability in FPGA's to better fit and optimize timing critical logic designs. More wires exacerbate the problem, while fewer wires keep the problem tractable, reducing FPGA cost.

Prior art FPGA architectures are discussed in detail in the IDS references cited in this Application. These patents disclose specialized routing blocks to connect logic elements in FPGA's and macro-cells in PLD's. In all IDS citations a fixed routing block is programmed to define inputs and outputs for the logic blocks, while the logic block performs a specific logic function. Such dedicated interconnect wires drive the cost of FPGAs over equivalent functionality ASICs. User specification to program the FPGA is held in FPGA configuration memory, which is coupled to logic in the FPGA. User specification to program a volatile FPGA is also duplicated in an external memory chip—however data from that memory chip is retrieved and loaded to on chip volatile configuration memory to configure the FPGA. Thus IDS cited FPGAs incur a huge penalty for on-chip configuration memory and MUXs that are needed for programmability. Some further require an expensive off-chip boot ROM to hold configuration data. Thus configuration memory expense is twice for SRAM based FPGAs.

Four methods of programming point to point connections, synonymous with programmable switches and programmable cross-bar points, between A and B are shown in FIG. 3. A configuration circuit to program the connection is not shown. All the patents listed in IDS use one or more of these basic connections to configure logic elements and programmable interconnects. The user implements the decision by programming a memory bit. This kind of configuration is different from a software instruction as the memory bit is physically generating a control signal to actively implement the decision. In FIG. 3A, a conductive fuse link 310 connects A to B. It is normally connected, and passage of a high current or a laser beam will blow the conductor open. In FIG. 3B, a capacitive anti-fuse element 320 disconnects A to B. It is normally open, and passage of a high current will pop the insulator to short the terminals. Fuse and anti-fuse are both one time programmable due to the non-reversible nature of the change. In FIG. 3C, a pass-gate device 330 connects A to B. The gate signal $S_0$ determines the nature of the connection, on or off. This is a non destructive change. The gate signal is generated by manipulating logic signals, or by configuration circuits that include memory. The choice of memory varies from user to user. In FIG. 3D, a floating-pass-gate device 340 connects A to B. Control gate signal $S_0$ couples a portion of that to floating gate. Electrons trapped in the floating gate determines on or off state of the connection. Hot-electrons and Fowler-Nordheim tunneling are two mechanisms to inject charge onto floating-gates. When high quality insulators encapsulate the floating gate, trapped charge stays for over 10 years. These provide non-volatile memory. EPROM, EEPROM and Flash memory employ floating-gates and are non-volatile. Anti-fuse and SRAM based architectures are widely used in commercial FPGA's, while EPROM, EEPROM, anti-fuse and fuse links are widely used in commercial PLD's. Volatile SRAM memory needs no high programming voltages, is freely available in every logic process, is compatible with standard CMOS SRAM memory, lends to process and voltage scaling and has become the de-facto choice for modern very large FPGA devices. Unfortunately they need an external expensive boot-ROM to save configuration data.

A volatile six transistor SRAM based configuration circuit is shown in FIG. 4A. The SRAM memory element can be any one of 6-transistor, 5-transistor, full CMOS, R-load or TFT PMOS load based cells to name a few. Two inverters 403 and 404 connected back to back forms the memory element. This memory element is a latch. The latch can be full CMOS, R-load, PMOS load or any other. Power and ground terminals for the inverters are not shown in FIG. 4A. Access NMOS transistors 401 and 402, and access wires GA, GB, BL and BS provide the means to configure the memory element. Applying zero and one on BL and BS respectively, and raising GA and GB high enables writing zero into device 401 and one into device 402. The output $S_0$ delivers a logic one. Applying one and zero on BL and BS respectively, and raising GA and GB high enables writing one into device 401 and zero into device 402. The output $S_0$ delivers a logic zero. The SRAM construction may allow applying only a zero signal at BL or BS to write data into the latch. The SRAM cell may have only one access transistor 401 or 402.

The SRAM latch will hold the data state as long as power is on. When the power is turned off, the SRAM bit needs to be restored to its previous state from an outside permanent memory (ROM). The outside memory is not coupled to programmable logic to configure the logic, and the data retrieval is identical to microprocessors retrieving external DRAM memory data to store and use in local cache. In the literature for programmable logic, this second non-volatile memory is also called configuration memory, and should not be confused with the applicant's definition of configuration memory that is coupled to programmable logic.

The SRAM configuration circuit in FIG. 4A controlling logic pass-gate as shown in FIG. 3C is illustrated in FIG. 4B. Element 450 represents the configuration circuit. The $S_0$ output directly driven by the memory element in FIG. 4A drives the pass-gate gate electrode. In addition to $S_0$ output and the latch, power, ground, data in and write enable signals in 450 constitutes the SRAM configuration circuit. Write enable circuitry includes GA, GB, BL, BS signals shown in FIG. 4A. An SRAM based switch is shown in FIG. 4B, where pass-gate 410 can be a PMOS, NMOS, or CMOS transistor pair. NMOS is preferred due to its higher conduction. The gate voltage $S_0$ on NMOS transistor 410 gate electrode determines an ON or OFF connection: $S_0$ having a logic level one completes the point to point connection, while a logic level zero keeps the nodes disconnected. That logic level is generated by a configuration circuit 450 coupled to the gate of NMOS transistor 410. The symbol used for the programmable switch comprising the SRAM device and the pass-gate is shown in FIG. 4C as the cross-hatched circle 460. SRAM memory data can be changed anytime in the operation of the device, altering an application and routing on the fly, thus giving rise to the concept of reconfigurable computing in FPGA devices.

A programmable MUX utilizes a plurality of point to point switches. FIG. 5 shows three different MUX based programmable logic constructions. FIG. 5A shows a programmable 2:1 MUX. In the MUX, two pass-gates 511 and 512 allow two inputs $I_0$ and $I_1$ to be connected to output O. A configuration circuit 550 having two complementary output control signals $S_0$ and $S_0'$ provides the programmability. When $S_0=1$, $S_0'=0$; $I_0$ is coupled to O. When $S_0=0$, $S_0'=1$; $I_1$ is coupled to O. With one memory element inside 550, one input is always coupled to the output. If two bits were provided inside 550, two mutually exclusive outputs $S_0$ and $S_1$ could be generated. That would allow neither $I_0$ nor $I_1$ to be coupled to O, if such a requirement exists in the logic design. FIG. 5B shows a programmable 4:1 MUX controlled by 2 memory elements. A similar construction when the 4 inputs $I_0$ to $I_3$ are replaced by 4 memory element outputs $S_0$ to $S_3$, and the pass-gates are controlled by two inputs $I_0$ & $I_1$ is called a 4-input look up table (LUT). The 4:1 MUX in FIG. 5B operate with two memory elements 561 and 562 contained in the configuration circuit 560 (not shown). Similar to FIG. 5A, one of $I_0$, $I_1$, $I_2$ or $I_3$ is connected to O depending on the $S_0$ and $S_1$ states. For example, when $S_0=1$, $S_1=1$, $I_0$ is coupled to O. Similarly, when $S_0=0$ and $S_1=0$, $I_3$ is coupled to O. A 3 bit programmable 3:1 MUX is shown in FIG. 5C. Point D can be connected to A, B or C via pass-gates 531, 533 or 532 respectively. Memory elements 571, 572 and 573 contained in a configuration circuit 570 (not shown) control these pass-gate input signals. Three memory elements are required to connect D to just one, any two or all three points. In reconfigurable computing, data in memory elements 571, 572 and 573 can be changed on the fly to alter connectivity between A, B, C and D as desired.

In the IDS reference citations, three dimensional concepts to construct building blocks in 3D FPGAs are disclosed. In a first aspect, 3D FPGA's reduce silicon area by positioning configuration memory above the programmable logic content. In a second aspect, an expensive user programmable RAM memory is first used to target a complex design into a programmable device, and when the design is frozen, the RAM is replaced by an inexpensive mask programmable ROM memory. In a third aspect, a thin film transistor comprising majority carrier conduction is used to construct 3-dimensional configuration circuits. Thin film SRAM memory has better alpha particle immunity over bulk SRAM. In a fourth aspect, a 3-dimensional thin-film transistor SRAM memory element is used to program programmable logic. In a fifth aspect MUXs are stacked over logic and configuration memory is stacked over MUXs to significantly reduce Silicon footprint. One or more of the disclosures, used individually or in conjunction with other disclosures demonstrate a significant improvement to 3D programmable logic devices over conventional 2D programmable logic devices.

SUMMARY

This disclosure reveals construction complexities and innovations associated with 3D FPGA circuits. A 3D FPGA device requires a plurality of I/O's & pads for signal wires to access the chip, a plurality of programmable logic/routing elements arranged in some regular or irregular construction of a logic block, a plurality of programmable logic blocks arranged in some array construction, one or more intellectual property (IP) cores that is frequently used by the user to interface with the programmable logic, a programmable interconnect matrix that interacts with all aforementioned components of the FPGA, and many other considerations. In typical 2D FPGA constructions, the configuration memory is inter-dispersed within various building blocks and coupled by metal wires to the logic elements as needed. Typically lower level metal layers (ex. metal-1, metal-2 and metal-3) are used to construct local circuits, such as coupling of programmable elements to configuration memory cells. In standard cell ASIC's, lower level metal layers are reserved to construct the standard cells. Arrangement of circuit components plays a crucial role in improving logic placement efficiency and reducing cost of 3D chips. As there are no efficient software tools that allow 3D active component stacking, newer construction techniques are needed for 3D chip constructions.

As disclosed herein, 3D programmable logic chips are constructed with efficient utilization of silicon for the user defined components (such as programmable logic, IP, pads, etc.) coupled to an efficient interconnect and routing fabric to arrange 3D circuit components. Such procedures identify appropriate vertical interconnect methods to couple configuration memory to programmable logic in a repeating and easy to construct interconnect fabric. Furthermore 3D FPGA's require lateral interconnects that stitch together to form longer wires, and the vertical interconnects not to block the efficiency with which this can be done. Efficient vertical configuration is achieved with repetitive structures that allow easy integration of complex programmable logic building blocks with varying user requirements into chips comprised of varying logic and memory densities, and deliver families of economical and efficient 3D programmable chips for the system design community.

In one aspect, a three dimensional programmable logic device (PLD), comprising: a programmable logic block having a plurality of configurable elements positioned in the logic block in a predetermined layout geometry; and a first array of configuration memory cells, each of said memory cells coupled to one or more of said configurable elements to program the logic block to a user specification, wherein the first array conforms substantially to the predetermined layout geometry and the first array is positioned substantially above or below the logic block.

Implementations of the above aspect may include one or more of the following. A programmable logic device may include a plurality of programmable logic block arrays. A logic block may be replicated in an array, or a plurality of complex logic blocks may be used instead of the array. A cell may be created with one or more logic blocks and replicated in an array to more efficiently construct a logic block array. A programmable logic block may further include a plurality of programmable logic units and logic elements. The logic unit by itself might be replicated in an array to form the logic block. A logic unit may be called a logic block, thus the logic block array may include a plurality of logic units arranged in an array. A programmable logic unit may further include a plurality of programmable elements, such elements including logic and routing elements. A memory cell may store a portion of an instruction to program a logic element. Thus a customer may use memory data to store an instruction to fully program the PLD. The logic unit may have said programmable elements mixed with non-configurable circuit components. In one example, a programmable switch may be inter-dispersed with logic transistors in a programmable circuit. In another example, a programmable multiplexer circuit may be inter-dispersed with logic transistors in programmable circuits. In yet another example, latches and flip-flops may be inter-dispersed with programmable look-up-table circuits and programmable MUX circuits to construct a programmable logic unit. A programmable interconnect structure may connect a plurality of logic units, or logic blocks, or logic arrays to each other, to pad structures and to IP blocks. Such interconnect structures complete the functionality of the integrated circuit and form connections to input and output pads. Said interconnect structure includes a programmable switch. Most common switch is a pass-gate device. A pass-gate is an NMOS transistor, a PMOS transistor or a CMOS transistor pair that can electrically connect two points. A pass-gate is a conductivity modulating element that includes a connect state and a disconnect state. Other methods of connecting two points include fuse links and anti-fuse capacitors. Yet other methods to connect two points may include an electrochemical or ferroelectric or any other cell. Programming these devices include forming one of either a conducting path or a non-conducting path.

The gate electrode signal on a pass-gate allows a programmable method of controlling an on and off connection. A plurality of pass-gates is included in said programmable logic blocks and programmable wire structure. The structure may include circuits consisting of CMOS transistors comprising AND, NAND, INVERT, OR, NOR, Look-Up-Table, Truth-Table, MUX, Arithmetic-Logic-Unit, Central-Processor-Unit, Programmable-Memory and Pass-Gate type logic circuits. Multiple logic circuits may be combined into a larger logic block. Configuration circuits are used to provide programmability. Configuration circuits have memory elements and access circuitry to change memory data. Each memory element can be a transistor or a diode or a group of electronic devices. The memory elements can be made of CMOS devices, capacitors, diodes, resistors and other electronic components. The memory elements can be made of thin film devices such as thin film transistors (TFT), thin-film capacitors and thin-film diodes. The memory element can be selected from the group consisting of volatile and non volatile memory elements. The memory element can also be selected from the group comprising fuses, antifuses, SRAM cells, DRAM cells, optical cells, metal optional links, EPROMs, EEPROMs, flash, magnetic and ferro-electric elements. Memory element can be a conductivity modulating element. One or more redundant memory elements can be provided for controlling the same circuit block. Such techniques should not be confused with redundancy in traditional DRAM, or Flash memory devices. The memory element may generate an output signal to control pass-gate logic. Configuration memory element may generate a signal that is used to derive a control signal. Configuration memory element may generate a data signal that is used to define a look-up value. The control signal is coupled to a pass-gate logic element, AND array, NOR array, a MUX or a Look-Up-Table (LUT) logic. It is known to one of ordinary skill that memory elements in traditional memory devices do not generate control signals.

Logic blocks and logic units include outputs and inputs. Logic functions perform logical operations. Logic functions manipulate input signals to provide a required response at one or more outputs. The input signals may be stored in storage elements. The output signals may be stored in storage elements. The input and output signals may be synchronous or asynchronous signals. The inputs of logic functions may be received from memory, or from input pins on the device, or from outputs of other logic blocks in the device. The outputs of logic blocks may be coupled to other inputs, or storage devices, or to output pads in the device, or used as control logic. Inputs and outputs couple to an interconnect fabric via programmable switches.

Structured cells are fabricated using a basic logic process capable of making CMOS transistors. These transistors are formed on P-type, N-type, epi or SOI substrate wafer. Every Integrated Circuit is constructed on a substrate layer. Configuration circuits, including configuration memory, constructed on same silicon substrate take up a large Silicon foot print. That adds to the cost of programmable wire structure compared to a similar functionality custom wire structure. A 3-dimensional integration of pass-gate and configuration circuits to connect wires provides a significant cost reduction in the incorporated-by-reference applications. The pass-gates and configuration circuits may be constructed above one or more metal layers. Said metal layers may be used for intra and inter connection of structured cells. The programmable wire circuits may be formed above the structured cell circuits by inserting a thin-film transistor (TFT) module or a laser-fuse model, or any other vertical memory structure. Said memory module may be inserted at any via layer, in-between two metal layers or at the top of top metal layer of a logic process. The memory element can generate an output signal to control logic gates. Memory element can generate a signal that is used to derive a control signal.

A logic block and a logic unit include layout geometry. Within the layout geometry, transistors are arranged efficiently to reduce the foot-print of Silicon needed for the layout. These transistors are coupled to each other with fixed interconnects as well as programmable interconnect. The programmable elements in a logic unit or a logic block may be randomly arranged. Some programmable elements may be regularly arranged with the layout area. Some programmable elements may be closely spaced, while other programmable elements may be spaced far apart from one another. A logic unit cell may repeat a plurality of times to form a logic block cell. The programmable elements may be substantially randomly located within the logic unit or the logic block to construct the respective cell with the least layout area. A memory cell may be needed to program the programmable element. A memory cell may be coupled to a programmable element to program the programmable element. A memory cell may be coupled to a plurality of programmable elements to program said elements. A plurality of memory cells may program a logic block or a logic unit. A plurality of memory cells is more efficiently constructed when constructed as a memory cell array. A programmable logic device may have a first layout area comprising a programmable logic block having a plurality of configurable elements randomly distributed. The device may have a second layout geometry comprising a contiguous array of configuration memory cells, the array constructed by replicating a memory cell. To improve the efficiency of the layout, the first layout geometry may be substantially identical to the second layout geometry, and the second layout geometry may be positioned substantially over the first layout geometry. Thus an efficiently constructed array of memory cell is designed to program an efficiently constructed logic block or logic unit. Furthermore, a unit cell comprising both logic block and memory cell array may be duplicated to construct larger building blocks. In the larger building blocks, the memory cells may combine to form a contiguous larger, efficiently constructed and positioned, array of memory cells. Thus the construction of a larger logic unit allows efficient construction of larger logic arrays.

In a first embodiment, the logic block has a first number of independently programmable elements (an independent programming element meaning one or more programmable elements programmed by a single memory cell). The array of memory cells to program said logic block has substantially similar first number of memory cells. The logic block is optimized to contain a substantially equal number of memory cells such that the memory cell area/geometry closely match the logic block area/geometry containing the programmable elements.

According to this invention, a 3D PLD may include an I/O cell having a first I/O region with a plurality of configurable elements positioned therein and a second I/O region; and a second array of configuration memory cells having a plurality of configuration memory cells, each of said second array memory cells coupled to one or more of said configurable elements in the first I/O region to program the I/O cell to a user specification, wherein the second array and the first I/O region conform substantially to the predetermined layout geometry and the second array is positioned substantially above or below the first I/O region.

Implementations of the above aspect may include one or more of the following. A programmable logic device includes a plurality of I/O cells, each I/O cell allowing an input or an output of PLD to couple to an external device. I/O cell may include a pad region that is bump bonded, or wire bonded as needed. The I/O cells may be arranged along the perimeter, or arranged in banks, or uniformly distributed within the PLD. The I/O cell may couple to the interconnect fabric of the PLD. The I/O cell may be programmable, the cell offering one of a plurality of I/O standards to be selected by a user as a desired I/O feature. The I/O cell may offer multiple voltage operating options. The I/O cell may offer sharing a pin amongst a plurality of inputs and outputs. The I/O cell may offer one or more of I/O standards including LVDS, SDR, DDR, LVTTL, LVPECL, LVCMOS, PCI, PCIX, GTL, GTLP, HSTL, SSTL, BLVDS. Thus a user may configure an I/O cell to an offered feature, including but not limited to the list shown.

An I/O cell includes layout geometry. Within the layout geometry, I/O circuit transistors are arranged efficiently to reduce the foot-print of Silicon needed for the layout. The I/O circuit transistors occupy an I/O circuit area/geometry. I/O cell includes a metal pad, the pad occupying a pad geometry or a pad region. The pad geometry may be adjacent to I/O circuit geometry. The I/O circuit geometry may include a first region of fixed functional circuits and a second region of programmable circuits. The second region may be adjacent to programmable logic geometry, thus a larger programmable geometry can be formed. The I/O transistors are coupled to each other with fixed interconnects as well as programmable interconnects. The programmable elements in an I/O cell may be located in only the I/O circuit geometry, more preferably in said second region, randomly arranged to improve layout efficiency. Some programmable elements may be regularly arranged with the layout geometry. Some programmable elements may be closely spaced, while other programmable elements may be spaced far apart from one another. An I/O cell may repeat a plurality of times to form an I/O cell group. The I/O circuit geometries may group to form contiguous region of circuit elements, including programmable elements which may form a repetitive structure of a substantially randomly located I/O circuit layout geometry. A memory cell may be needed to program the programmable element. A memory cell may be coupled to a programmable element to program the programmable element. A memory cell may be coupled to a plurality of programmable elements to program said elements. A plurality of memory cells may program an I/O circuit. A plurality of memory cells is more efficiently constructed when constructed as a memory cell array. An I/O cell may have a first layout geometry comprising an I/O circuit having a plurality of configurable elements randomly distributed. The device may have a second layout geometry comprising a contiguous array of configuration memory cells, the array constructed by replicating a memory cell. To improve the efficiency of the layout, the first layout geometry may be substantially identical to the second layout geometry, and the second layout geometry may be positioned substantially above the first layout geometry. Thus an efficiently constructed array of memory cells is designed to program an efficiently constructed I/O cell. Furthermore, the I/O cell, comprising both I/O pad and I/O circuit, may be duplicated to construct larger I/O blocks. In the larger building blocks, the memory cells may combine to form a contiguous larger, efficiently constructed and positioned, array of memory cells. Thus the construction of an I/O cell with overlay of memory cells allows efficient construction of larger I/O groups.

Further more the array of memory cells required to program a programmable logic block array, and the array of memory cells to program the I/O cell group may further combine to form a contiguous array of efficiently constructed and positioned memory cells. In one embodiment, all of the programmable elements may be located in substantially rectangular layout geometry, and the contiguous memory cell array may have an identical geometry. The total number of memory cells may match the total number of independently programmed elements such that the construction is efficient.

According to this invention, a PLD may include a programmable intellectual property (IP) block having a first IP region with a plurality of configurable elements positioned within the region and a second I/P region; and a third array of configuration memory cells having a configuration memory cells and coupled to one or more of said configurable elements in the first IP region, a plurality of memory cells in the third array coupled to the plurality of configurable elements in IP block to program the IP block to a user specification, wherein the third array and the first IP region conform to the predetermined layout geometry and the third array is positioned substantially above or below the first IP region.

Implementations of the above aspect may include one or more of the following. A programmable logic device includes a plurality of IP blocks, each IP block allowing a user to implement a specific function. A plurality of inputs and outputs couple the IP block to the interconnect fabric. The IP block may be arranged along the perimeter, or arranged in banks, or uniformly distributed within the PLD. The IP block may be programmable, the block offering one of a plurality of altering functions to be selected by a user as a desired feature. The IP block may offer multiple power/performance tradeoffs. The IP block may be a memory block with data width and depth alterability. The IP block may a Multiply-Accumulate unit with varied DSP capability. The IP block may be a CPU block with varied instruction-set capability. The IP block may be PLL or DLL blocks offering programmability. Thus a user may configure an IP block to one of the offered features, including but not limited to the listed IP above.

An IP block includes layout geometry. Within the layout geometry, IP circuit transistors are arranged efficiently to reduce the foot-print of silicon needed for the layout. The IP circuit transistors occupy a fixed IP circuit geometry and one or more programmable IP circuit geometries. In a memory IP block, the fixed IP geometry may contain the (single-port, dual-port etc.) memory cells, while the programmable IP region may contain the programmable elements to configure data width & depth, build FIFOs, as well as couple the IP block to interconnect fabric. The programmable circuit region may be adjacent to programmable logic geometry, thus a larger programmable geometry can be formed. The IP transistors are coupled to each other with fixed interconnects as well as programmable interconnect. The programmable elements in an IP block may be located in only the programmable circuit area, wherein the programmable elements are randomly arranged to improve layout efficiency. Some programmable elements may be regularly arranged with the layout geometry. Some programmable elements may be closely spaced, while other programmable elements may be spaced far apart from one another. An IP block may repeat a plurality of times to form an IP block group. The IP circuit areas may group to form contiguous region of circuit elements, including programmable elements which may form a repetitive structure of a substantially randomly located IP programmable element layout geometry. A memory cell may be needed to program the programmable element. A memory cell may be coupled to a programmable element to program the programmable element. A memory cell may be coupled to a plurality of programmable elements to program said elements. A plurality of memory cells may program an IP block. A plurality of memory cells is more efficiently constructed when constructed as a memory cell array. An IP block may have a first layout geometry comprising an IP circuit having a plurality of configurable elements randomly distributed. The device may have a second layout geometry comprising a contiguous array of configuration memory cells, the array constructed by replicating a memory cell. To improve the efficiency of the layout, the first layout area/geometry may be substantially identical to the second layout area/geometry, and the second layout geometry may be positioned substantially above the first layout geometry. Thus an efficiently constructed array of memory cells is designed to program an efficiently constructed IP block. Furthermore, the IP block, comprising both non-programmable and programmable circuits, may be duplicated to construct larger IP blocks. In the larger building blocks, the configuration memory cells may combine to form a contiguous larger, efficiently constructed and positioned, array of memory cells. The configuration memory cells are positioned above the programmable circuit region of the IP blocks, occupying the same geometry. Thus the construction of an IP block with overlay of memory cells allows efficient construction of larger IP blocks.

In yet another aspect, a three dimensional programmable logic device (PLD), comprising: a plurality of I/O cells, each I/O cell comprising: a fixed circuit region; and a programmable circuit region having a plurality of programmable elements to configure the I/O cell; and one or more intellectual property (IP) cores, each IP core comprising: a fixed circuit region; and a programmable circuit region having a plurality of programmable elements to configure the IP core; and a programmable logic block array region comprising: a plurality of substantially identical programmable logic blocks replicated to form the array, each said logic block further comprising a plurality of programmable elements; and a programmable region comprising positioned programmable elements of said programmable logic block array region, the one or more of IP core programmable circuit regions and the one or more of I/O cell programmable circuit regions; and a configuration memory array comprising configuration memory cells coupled to one or more of said programmable elements in the programmable region, the memory array programming the programmable region, wherein: the memory array is positioned substantially above or below the programmable region; and the memory array and programmable region layout geometries are substantially identical.

In yet another aspect, a three dimensional programmable logic device (PLD), comprising: a plurality of distributed programmable elements located in a substrate region; and a contiguous array of configuration memory cells, a plurality of said memory cells coupled to the plurality of programmable elements to configure the programmable elements, wherein: the memory array is positioned substantially above or below the substrate region; and the memory array and the substrate region layout geometries are substantially similar. The said PLD further includes: a contiguous array of metal cells, each metal cell having the configuration memory cell dimensions and a metal stub coupled to the configuration memory cell and to one or more of said programmable elements. Furthermore, the metal cell array is positioned below the memory cell array and above the programmable elements. Furthermore, two or more metal cells further includes a metal line adjacent to the metal stub extending from one end of the cell to the opposite end of the cell, wherein two or more adjacent metal cells form a continuous metal line.

In yet another aspect, a vertically configured programmable logic device (PLD), includes: a unit cell wherein the unit cell geometry includes a first dimension in a first direction and a second dimension in a second direction orthogonal to said first direction; and an array of configuration memory cells, the array constructed by placing a memory cell within the unit cell geometry and replicating the unit cell to form the memory array; and a plurality of programmable elements positioned in a geometry substantially similar to the geometry of the configuration memory cell array; and an array of first metal cells, the array constructed by replicating a first metal cell of said unit cell dimensions in an array, the first metal cell further comprising: a first region comprised of one or more parallel metal bus lines, the bus line extending between opposite cell boundaries in the first or second direction to form a global bus wire; and a second region comprised of a metal stub coupled to the configuration memory cell positioned above the first metal stub and one or more of said programmable elements positioned below the first metal stub. Furthermore, the 3D PLD further includes: an array of second metal cells, the array constructed by replicating a second metal cell of said unit cell dimensions in an array, the second metal cell further comprising: a first region comprised of two or more parallel metal lines, the metal line extending between opposite cell boundaries in the first or second direction to form global routing wires; and a second region comprised of metal stubs and metal lines to facilitate vertical routing of configuration memory cells and signals.

The advantages of the above embodiments may be one or more of the following. The embodiments provide grouping of programmable elements and metal interconnect for the purpose of coupling to vertically positioned configuration elements during construction of 3D FPGA. The innovation also pertains to creating unit cells within the layout geometries to facilitate the 3D construction. The programmable blocks are arranged such that all of the programmable elements in the array combine to form a larger region of programmable elements. The IP blocks are arranged adjacent to logic blocks such that the programmable elements combine into yet a larger programmable region. The I/O cells are arranged such that the programmable elements in the I/O cells further add to the common programmable region, thereby providing even a larger foot-print of programmable elements. These conglomerated programmable regions can be built to have exact (or nearly exact) dimensions of an array of unit cells. The array may include M rows and N columns of unit cells, where M and N are integers greater then one. Preferably M and N are integers greater than 100, and more preferably M and N are integers greater than 1000. The conglomerated region of programmable elements is now coupled to one large array of vertically positioned configuration memory cells. The coupling is further facilitated by metal stubs in an intermediate metal layer. Metal routing, power and ground are distributed in the same metal layers. Thus the concept of a unit metal cell is important to construct these three dimensional interconnects. Each memory cell output couples to a metal stub. Each metal stub couples to one or more programmable elements. The vertical interconnect (meaning the Z-direction) cannot break the horizontal interconnect (meaning X and Y directions). Metal buses are positioned in between the metal stubs for global interconnects and busses. In the first and second metal layers, metal lines run in X or Y direction (orthogonal to said X direction). There may be a plurality of first metal layers and second metal layers as stated. Global and local interconnect wires are also positioned into metal cells. A first region of the metal cell includes global metal wires for interconnects, and a second region of the metal cell includes local interconnects for the vertical configuration. The memory cell is more efficiently constructed when a single cell array is used to configure a conglomerated programmable element region, rather than disjoint and inefficiently crafted random memory cells or smaller cell arrays are used.

Thus the current teachings offer a new approach to building 3D programmable devices. These devices include programmable elements constructed in a substrate layer or plane. Programmable elements within multiple circuit blocks are arranged and grouped such that on the substrate layer, the programmable elements form large clusters. Each cluster is configured by a configuration memory cell array positioned vertically above the programmable elements. A memory cell in the array is coupled to one or more programmable elements. Thus a plurality of programmable element clusters is programmed by a plurality of configuration memory cell arrays. Such a device, from a user perspective, offers the capability of vertically configuring the FPGA to the user's specification. Once the user is satisfied with the performance and functionality, the user is able to easily change the configuration memory cell from an expensive 3D RAM element to an inexpensive ROM element to freeze the design in an ASIC form. Such a change requires no design activity, saving the designer considerable NRE costs and time. It further saves the expensive boot-ROM in the system board. An easy turn-key customization of an ASIC from an original smaller cheaper and faster PLD or FPGA would greatly enhance time to market, performance, and product reliability.

BRIEF DESCRIPTION OF THE DRAWINGS

FIG. 3A shows an exemplary fuse link point to point connection.

FIG. 3B shows an exemplary anti-fuse point to point connection.

FIG. 3C shows an exemplary pass-gate point to point connection.

FIG. 3D shows an exemplary floating-pass-gate point to point connection.

FIG. 4A shows an exemplary configuration circuit for a 6T SRAM element.

FIG. 4B shows an exemplary programmable pass-gate switch with SRAM memory control.

FIG. 4C shows the symbol used for switch in FIG. 4B.

FIG. 5A shows an exemplary 2:1 MUX controlled by one memory bit.

FIG. 5B shows an exemplary 4:1 MUX controlled by 2 memory bits.

FIG. 5C shows an exemplary 3:1 MUX controlled by 3 memory bits.

FIG. 7D shows a memory cell used in the memory array shown in FIG. 7C.

FIG. 8A shows a top metal layer according to the current invention.

FIG. 8B shows a metal layer for CAD generated patterns according to the current invention.

DESCRIPTION

Figure 1:
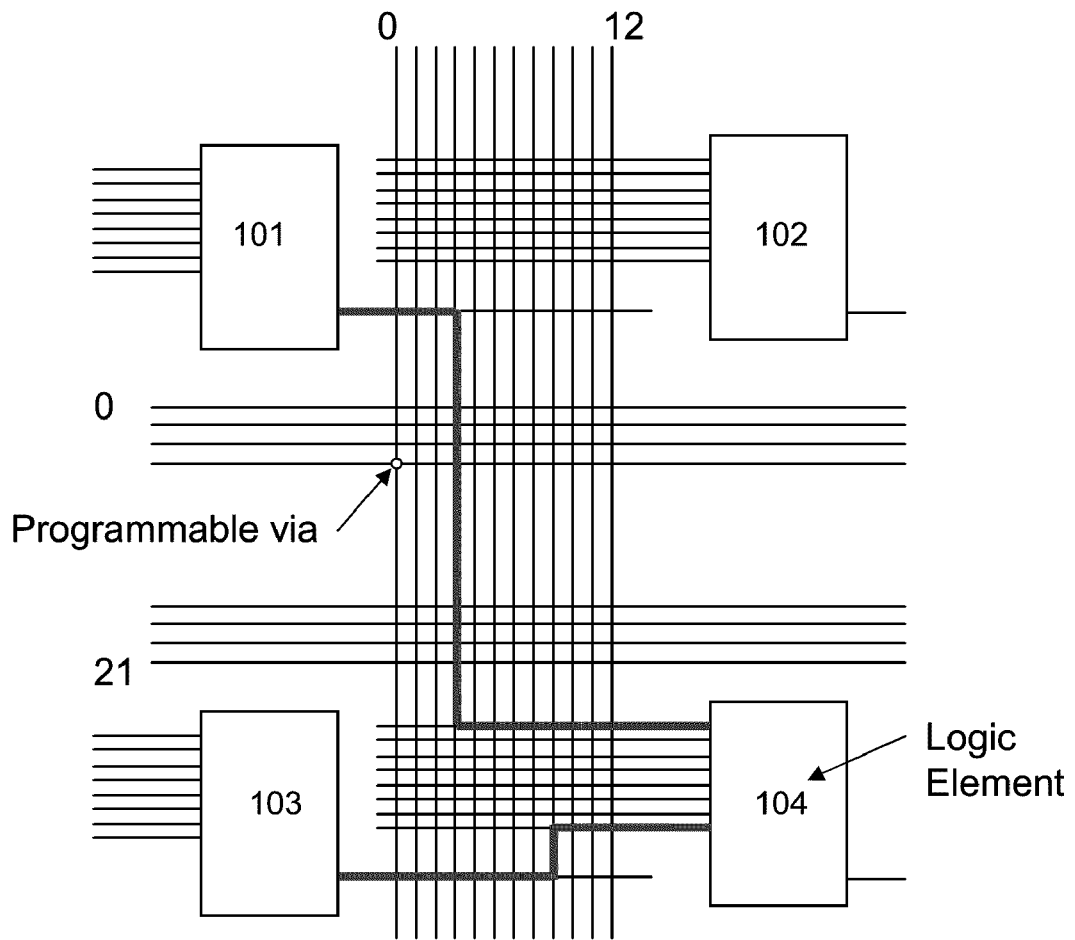
FIG. 1 shows an exemplary interconnect structure utilizing a logic element.
Figure 2:
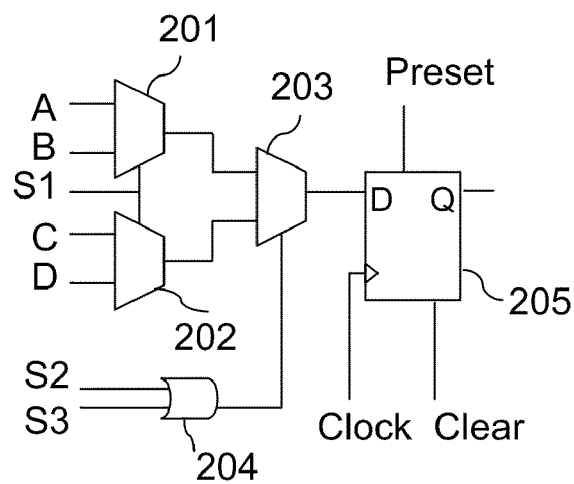
FIG. 2 shows an exemplary logic element.

In the following detailed description of the invention, reference is made to the accompanying drawings which form a part hereof, and in which is shown, by way of illustration, specific embodiments in which the invention may be practiced. These embodiments are described in sufficient detail to enable those skilled in the art to practice the invention. Other embodiments may be utilized and structural, logical, and electrical changes may be made without departing from the scope of the present invention.

Definitions: The terms "wafer" and "substrate" used in the following description include any structure having an exposed surface with which to form the integrated circuit (IC) structure of the invention. The term substrate is understood to include semiconductor wafers. The term substrate is also used to refer to semiconductor structures during processing, and may include other layers that have been fabricated thereupon. Both wafer and substrate include doped and undoped semiconductors, epitaxial semiconductor layers supported by a base semiconductor or insulator, SOI material as well as other semiconductor structures well known to one skilled in the art. The term "conductor" is understood to include semiconductors, and the term "insulator" is defined to include any material that is less electrically conductive than the materials referred to as conductors. Thus every IC includes a substrate.

The term "module layer" includes a structure that is fabricated using a series of predetermined process steps. The boundary of the structure is defined by a first process step, one or more intermediate process steps, and a final process step. The resulting structure is formed on a substrate. A cross-section of a semiconductor device may be used to identify module layer boundaries. It is understood that some processing steps such as resist patterning and cleans do not leave structural imprints to a module layer. It is further understood that some processing steps such deposition and etching leave structural imprints in a module layer. Thus a module layer includes processing steps that may or may not make a structural imprint.

The term "pass-gate" and "switch" refers to a structure that can pass a signal when on, and block signal passage when off. A pass-gate connects two points when on, and disconnects two points when off. A pass-gate couples two points when on, and decouples two points when off. A pass-gate can be a floating-gate transistor, an NMOS transistor, a PMOS transistor or a CMOS transistor pair. The gate electrode of transistors determines the state of the connection. A CMOS pass-gate requires complementary signals coupled to NMOS and PMOS gate electrodes. A control logic signal is connected to gate electrode of a transistor for programmable logic. A pass-gate can be a conductivity modulating element. The conductivity may be made to change between a sufficiently conductive state and a sufficiently nonconductive state by a configuration means. The configurable element may comprise a chemical, magnetic, electrical, optical, and ferroelectric or any other property that allows the element to change its conductivity between said two states.

The term "buffer" includes a structure that receives a weak incoming signal and transmits a strong output signal. Buffers provide high drive current to maintain signal integrity. Buffer includes repeaters that rejuvenate signal integrity in long wires. Buffer further includes a single inverter, and a series of connected inverters wherein each inverter in the series is sized larger to provide a higher drive current.

The term "bridge" includes a structure that manages routing within a set or a cluster of wires. Signals arriving at the bridge on a wire may be transmitted to one or more other wires in that bridge. A bridge includes simple transmission, buffered transmission, uni-directional or multi-directional routing on the wire cluster. A bridge includes switch blocks, MUXs & wires.

The term "configuration circuit" includes one or more configurable elements and connections that can be programmed for controlling one or more circuit blocks in accordance with a predetermined user-desired functionality. The configuration circuit includes the memory element and the access circuitry, herewith called memory circuitry, to modify said memory element. A memory element in the configuration circuit is coupled to a programmable circuit block to configure the circuit block. Thus a configuration circuit is different from traditional circuits in memory devices. Configuration circuit does not include the logic pass-gate controlled by said memory element. In one embodiment, the configuration circuit includes a plurality of memory elements to store instructions to configure an FPGA. In another embodiment, the configuration circuit includes a first selectable configuration where a plurality of memory elements is formed to store instructions to control one or more circuit blocks. The configuration circuit includes a second selectable configuration with a predetermined conductive pattern formed in lieu of the memory circuit to control substantially the same circuit blocks. The memory circuit includes elements such as diode, transistor, resistor, capacitor, metal link, among others. The memory circuit also includes thin film elements. In yet another embodiment, the configuration circuit includes a predetermined conductive pattern comprising one or more of via, resistor, capacitor or other suitable ROM circuits in lieu of RAM circuits to control circuit blocks. Configuration circuit should not be confused with memory circuits in memory devices.

The term "time-multiplexing" includes the ability to differentiate a value in time domain. The value may be a voltage, a signal or any electrical property in an IC. A plurality of time intervals make a valid time period. Inside the time period, a value includes a plurality of valid states: each state attributed to each time interval within the period. Thus time-multiplexing provides a means to identify a plurality of valid values within a time period.

The term "geometry" as used in this application is defined as a shape of a specific structure or a circuit. Geometry includes an area and a boundary. Thus circuit geometry refers to the shape or layout foot-print of the circuit elements of the circuit. In a Cartesian coordinate system, circuit geometries may take triangular, square, rectangular, T, L, or any other shape. A rectangular geometry is characterized by a first dimension in a first direction and a second dimension in a second direction orthogonal to first direction. Circuit geometry includes the dimensions of the circuit layout foot-print on a substrate layer, the area and the boundary.

The term "horizontal" as used in this application is defined as a plane parallel to the conventional plane or surface of a wafer or substrate, regardless of the orientation of the wafer or substrate. The term "vertical" refers to a direction perpendicular to the horizontal direction as defined above. Prepositions, such as "on", "side", "higher", "lower", "over" and "under" are defined with respect to the conventional plane or surface being on the top surface of the wafer or substrate, regardless of the orientation of the wafer or substrate. The following detailed description is, therefore, not to be taken in a limiting sense.

A three dimensional point to point connection can be made by utilizing programmable pass-gate logic as shown in FIG. 3C, however the memory element that generates the control signal $S_0$ is located substantially above or below the pass-gate logic element rather than adjacent to the pass-gate. A plurality of pass-gates may be configured by a plurality of vertically coupled memory elements. The vertical configuration may be achieved with thin-film-transistor (TFT) technology, or any other suitable technology. Regardless of the vertical position of the memory element, a new vertical interconnection scheme that navigates through horizontal interconnects is required to couple the plurality of vertical memory elements to the plurality of programmable elements such as pass-gate 330. Multiple inputs (node A) can be coupled to multiple outputs (node B) with the plurality of pass-gate logic elements. In a 3D construction of the switch in FIG. 4B, the entire configuration circuit, including the memory element may be positioned above the pass-gate. In another embodiment, only the SRAM latch may be positioned above the pass-gate 410, while the decoding transistors (such as 401, 402 in FIG. 4A) may be positioned along side with transistor 410 in FIG. 4B. As the gate electrode of pass-gate 410 has no current leakage path by design (i.e. it is a high impedance node) only a very small current level is required to drive the gate electrode to an ON or OFF state. The configuration circuit (450 in FIG. 4B) needs to generate two outputs, logic zero and logic one, to program NMOS (or PMOS) pass-gate in the connection. 3D configuration circuit 450 contains a memory element. Most CMOS SRAM memory delivers logic zero or logic one outputs. This 3D memory element can be configured by the user to select the polarity of $S_0$, thereby selecting the status of the connection. The memory element can be volatile or non-volatile. In volatile memory, it could be constructed with one or more DRAM, SRAM, Optical or any other type of a memory element that can output a valid signal $S_0$. In non-volatile memory it could be fuse, anti-fuse, EPROM, EEPROM, Flash, Ferro-Electric, Magnetic or any other kind of memory device that can output a valid signal $S_0$. The signal $S_0$ can be a direct output of a memory element, or a derived output from the configuration circuitry. An inverter can be used to restore $S_0$ signal level to full rail to rail voltage levels. The SRAM in configuration circuit 450 can be operated at an elevated Vcc level to output an elevated $S_0$ voltage level. This is especially feasible when the SRAM is built in a separate TFT module. Other configuration circuits to generate valid $S_0$ signals are easily derived by those familiar in the art.

TFT transistors, switching devices and latches SRAM cells are described in incorporated-by-reference application Ser. No. 10/979,024 filed on Nov. 2, 2004, application Ser. No. 10/413,809 (now U.S. Pat. No. 6,855,988) filed on Apr. 14, 2003 and application Ser. No. 10/413,810 (now U.S. Pat. No. 6,828,689) filed on Apr. 14, 2003. They show means and methods to construct 3D transistors and storage devices. In a preferred embodiment, the configuration circuit is built on thin-film semiconductor layers located vertically above the logic circuits. The SRAM memory element, a thin-film transistor (TFT) CMOS latch as shown in FIG. 4A, includes two lower performance back to back inverters formed on two semiconductor thin film layers, substantially different from a first semiconductor single crystal substrate layer and a gate poly layer used for logic transistor construction. This latch is stacked above the logic circuits for slow memory applications with no penalty on Silicon area and cost. This latch is adapted to receive power and ground voltages in addition to configuration signals. The two programming access transistors for the TFT latch are also formed on thin-film layers. Thus in FIG. 4B, all six configuration transistors shown in 450 are constructed in TFT layers, vertically above the pass transistor 410. Transistor 410 is in the conducting path of the connection and needs to be a high performance single crystal Silicon transistor. This vertical integration makes it economically feasible to add an SRAM based configuration circuit at a very small cost overhead to create a programmable solution. Such vertical integration can be extended to all other memory elements that can be vertically integrated above logic circuits.

New 3-dimensional programmable logic devices utilizing thin-film transistor configurable circuits are disclosed in incorporated-by-reference application Ser. No. 10/267,483, application Ser. No. 10/267,484 (now abandoned) and application Ser. No. 10/267,511 (now U.S. Pat. No. 6,747,478). The disclosures describe 3D programmable devices and programmable to application specific convertible devices. The 3D PLD is fabricated with a programmable memory module, wherein the memory module is positioned above the logic module. The ASIC is fabricated with a conductive pattern in lieu of the memory module in said 3D PLD. Both memory module and conductive pattern provide identical control of logic circuits, preserving the logic functionality mapped to either device. For each set of memory bit patterns, there is a unique conductive pattern to achieve the same logic functionality. The vertical integration of the configuration circuit leads to a significant cost reduction for the PLD, and the elimination of TFT memory for the ASIC allows an additional cost reduction for the user. The chip construction with such vertical memory integration is described next. However, these teachings do not describe how the programmable elements are arranged in the logic module, how the memory elements are arranged in the memory module, and how the modules are interconnected. A significant innovation of FPGAs come from the interconnect fabric that stitch programmable and non-programmable elements together into a timing predictable software environment easily usable to a user. The current disclosure describes how such 3D PLDs and 3D FPGAs are constructed.

Figure 6A:
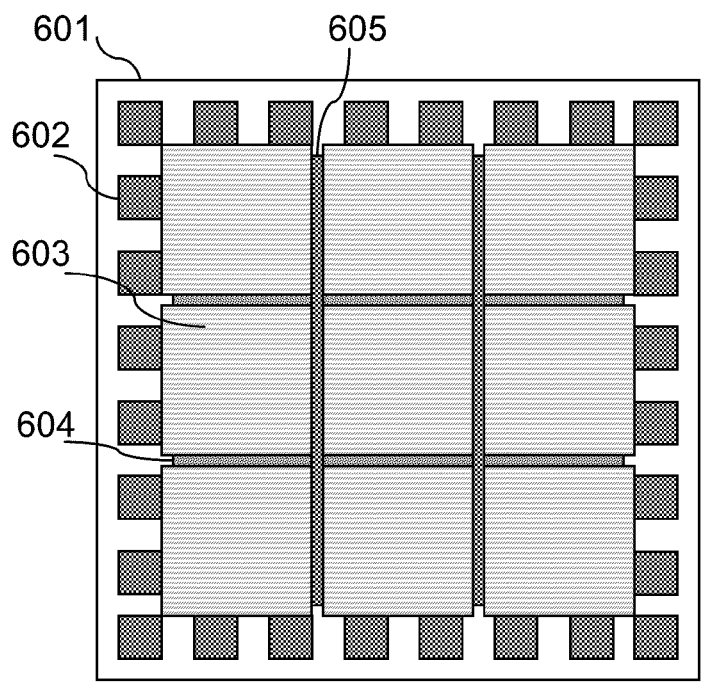
FIG. 6A shows a first embodiment of a 3D programmable logic device.

FIG. 6A shows a top down view of a first embodiment of a 3-dimensional FPGA (or PLD) according to a first embodiment of the invention. It includes a semiconductor chip (or Integrated Circuit, or IC) region 601, said region obtained by dicing a fully processed semiconductor wafer through methods and techniques know to one familiar in the art. Chip region 601 has a boundary, and this boundary has a die-seal region (not shown) to improve reliability of the chip as known to those skilled in the art. The chip region has a plurality of pad regions such as pad regions 602 fully enclosed by the die-seal boundary. These pad regions 602 may be aligned along the perimeter as shown. The pad regions 602 may be staggered along the perimeter, or arranged in columns, rows, or in any other fashion that is known in the art. The chip 601 further includes one or more 3-dimensional circuit blocks such as blocks 603. In a preferred embodiment, circuit block 603 includes configuration circuit blocks, said blocks arranged in an array as shown in FIG. 6A. The array may comprise of M rows and N columns, where M and N are integers greater than or equal to one. A circuit block 603 may be constructed on TFT layers positioned above interconnect metal layers of the FPGA. The circuit block 603 may be constructed on TFT layers sandwiched between interconnect metal layers of the FPGA, said interconnect facilitating circuit connections of FPGA circuits. The circuit block 603 may comprise one or more metal layers to construct configuration circuits. A first block of 3D configuration circuits 603 is separated from a second block of configuration circuits by a substantial space in between the two blocks. Such spaces may comprise wide metal bus lines such as 604 and 605. These wide metal lines may further comprise power and ground voltages required to power the chip. The spaces may further contain clock and other metal signal lines required by the FPGA. The 3-dimensional block is constructed not to cover the pad regions 602 in FIG. 6A to facilitate external wire bonding or flip chip bonding or any other types of bonding to the pads. Circuit blocks 603 hide features underneath the blocks in the top view in FIG. 6A.

Figure 6B:
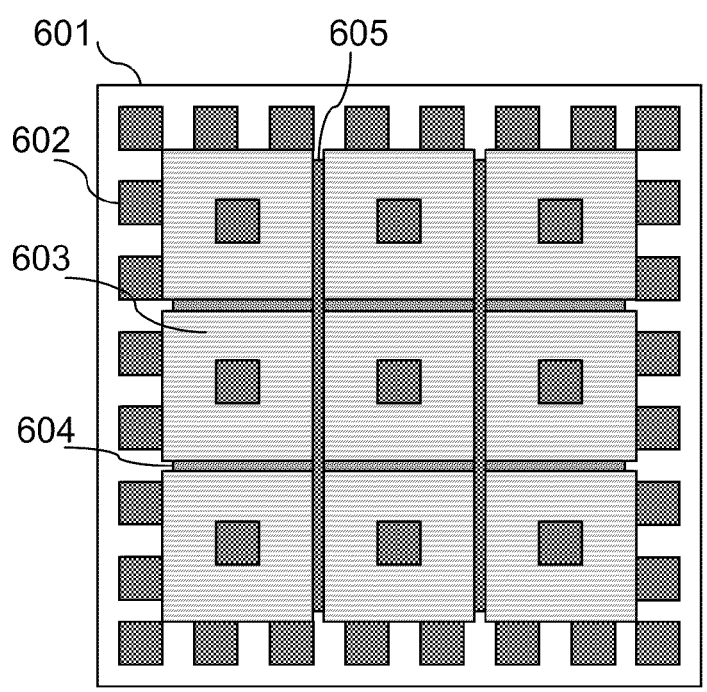
FIG. 6B shows a second embodiment of a 3D programmable logic device.

In a second preferred embodiment, shown in FIG. 6B, a pad 602 may be further positioned above a configuration circuit block 603 to facilitate bump-bonding of the pads 602. These pads 602 may be further coupled to I/O structures via re-distribution metal layers as known to one familiar in the art. The current invention is not limited in scope to the illustrative examples of pad constructions as shown, and those skilled in the art will recognize other methods of constructing pads 603.

Figure 6C:
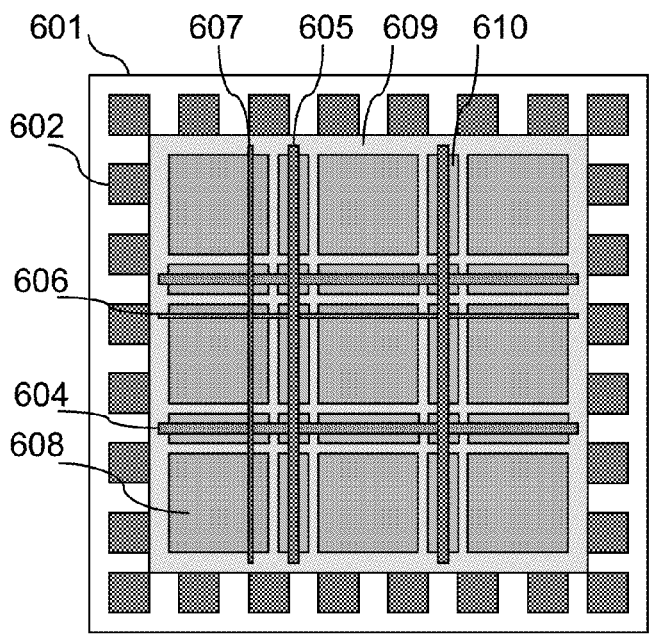
FIG. 6C shows the top-view of FIG. 6A with the top memory layer removed.

FIG. 6C provides a top-view of FIG. 6A when the fabrication layers containing circuit blocks 603 (as well as any metal above the circuit layer) are stripped from the chip. Removal of circuit blocks 603 allow visibility of blocks underneath otherwise hidden by the blocks. In a preferred 3D chip construction, it further reveals other metal lines such as 606 and 607 which act as interconnect to underlying circuits. It reveals intellectual property (IP) cores/IP circuit blocks such as 610, programmable logic block arrays such as 608 and programmable routing regions such as 609. In the shown preferred arrangement, an IP block 610 is positioned between a first and second logic block array 608. In FIG. 6C, IP blocks are shown positioned along horizontal and vertical boundaries of logic block arrays. In other arrangements such IP blocks may be positioned along only horizontal or along only vertical boundaries. In yet other arrangements, a plurality of IP blocks may be grouped into a larger block that is intermixed with a programmable logic array block such as 608. In one embodiment, the grouped IP block may have a substantially similar area to the programmable logic block array. Thus the concepts described in constructing the logic blocks of a 3D FPGA should not be construed in a limiting sense just to the illustrative diagrams shown.

Figure 7A:
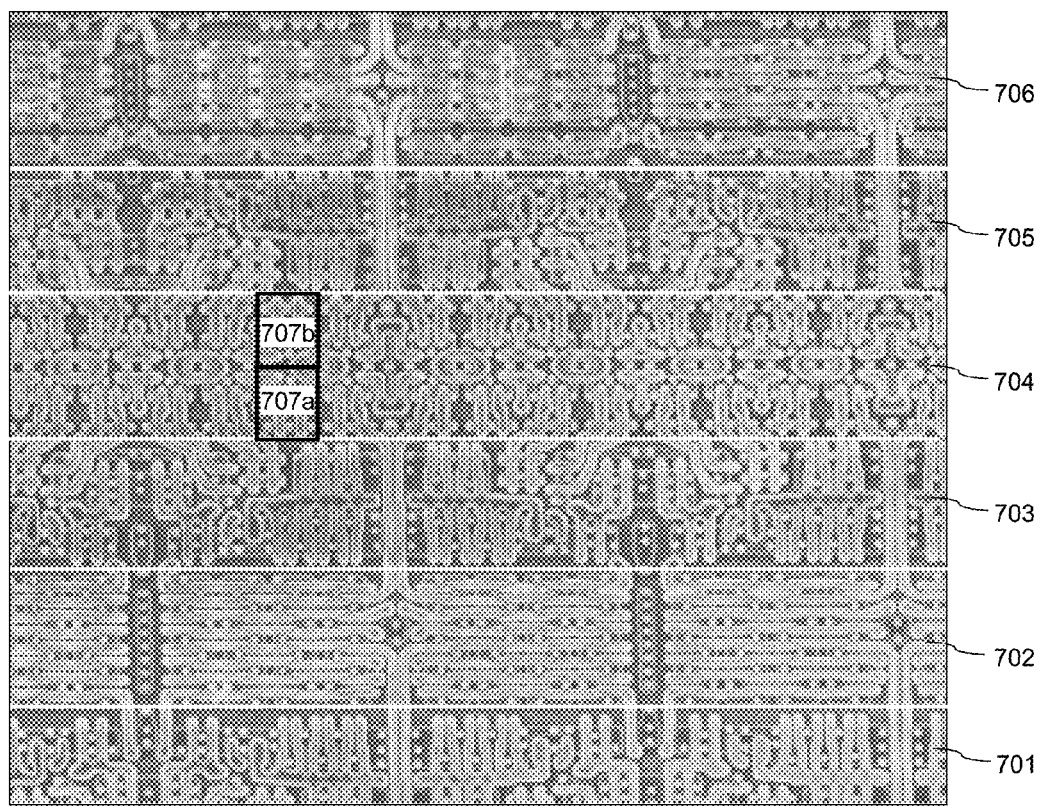
FIG. 7A shows a top view of a 2D FPGA stripped down to poly layer from the top.

FIG. 7A is shown to illustrate the prior-art in arranging programmable elements of conventional 2D FPGA devices. FIG. 7A is a top view of a best-in-art Virtex FPGA device commercialized by Xilinx, Inc. The metal layers and isolation oxide layers are removed top-down in FIG. 7A such that transistor construction is visible. Thus gate poly, active Si region boundary and contact imprints are seen in the photo. In FIG. 7A, it is seen that SRAM cells (such as 707) are arranged in row 704 and SRAM outputs are coupled to programmable elements. Some outputs are coupled in polysilicon (poly) as can be seen FIG. 7A, while other outputs are coupled by metal that has been removed and cannot be seen. In row 704, two SRAM cells 707a and 707b are arranged back-to-back, and the pair is duplicated to form the row of memory cells. Transistors in rows 701, 703 and 705 form buffers, each buffer is coupled to signal inputs and/or outputs by programmable circuits. Rows 702 and 706 show programmable multiplexer (MUX) circuits, each gate poly region of a MUX coupled to an output of an SRAM cell (by poly as seen or by metal which was removed and cannot be seen). Programmable elements within FIG. 7A (such as the gate poly geometries in MUXs in rows 702 & 705) are seen randomly located to achieve layout area efficiency. Other rows of SRAM cells, similar to row 704, are located below the buffer row 701 in this device construction. It should be noted that from a memory bit density view point, the SRAM cell density within a columnar region must match the independently programmed elements within said region localized to above and below the memory row. In FIG. 7A, each SRAM cell has an output (metal not shown) and the output is coupled to one or more programmable elements. Thus the programmable elements in the "state of the prior art" 2D FPGA are: (i) inter-mixed with SRAM cells, (ii) arranged in a row fashion to efficiently couple logic to SRAM cells, (iii) has matching density of programmable and SRAM elements in column stripes orthogonal to memory rows, (iv) coupled to outputs of SRAM cells.

Figure 7B:
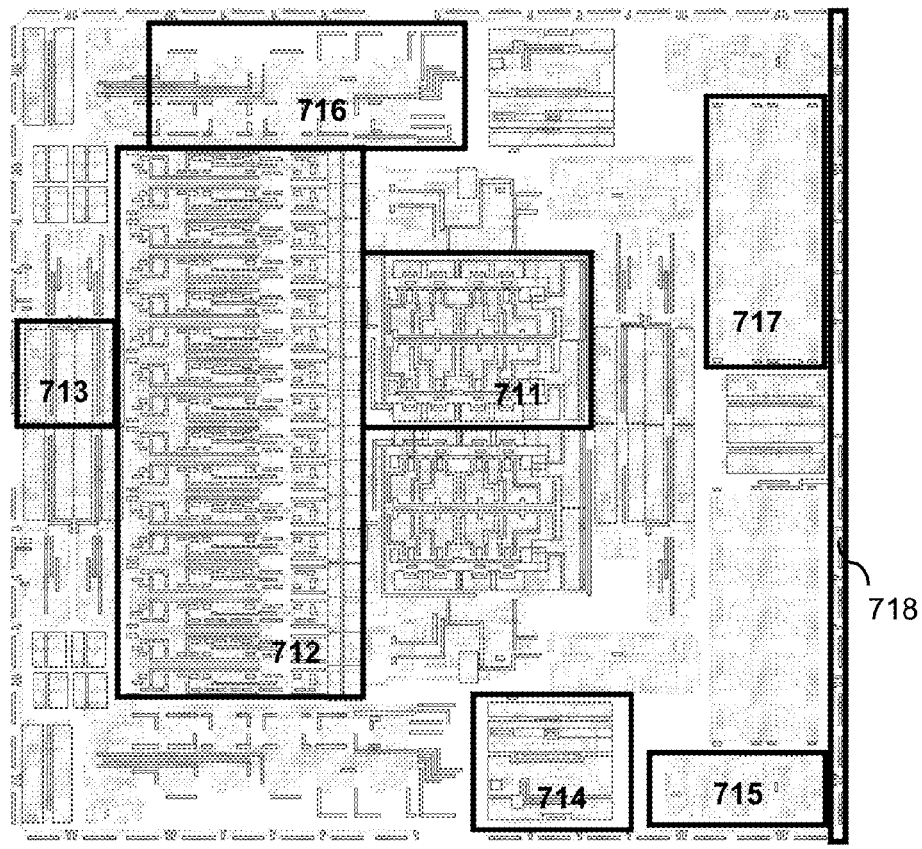
FIG. 7B shows a programmable logic block according to current invention.

The best memory area efficiency is achieved when memory cells are arranged in larger blocks, and not when placed individually or in pair-fashion. Such an efficient memory block cannot be used in 2D-FPGA as each memory cell must be coupled to one or more programmable elements. A memory block (deeper than a few bits in depth) does not have adequate space on top of the array to construct metal interconnects that must couple each memory cell output to one or more neighboring programmable elements. According to a current preferred embodiment, the logic blocks of 3D FPGA is constructed without SRAM cells in the silicon substrate surface. A first embodiment of such an arrangement of a programmable logic cell is shown in FIG. 7B. Alternatively, FIG. 7B may be called a logic block, a logic unit, a unit cell, a basic logic element or by any other name. It is capable of providing a complex logical manipulation of a plurality of inputs. The cell includes a plurality of programmable circuits such as 711-717, each circuit comprising a plurality of randomly positioned programmable elements (or programmable input nodes to which the control signal must couple). The cell may include a first dimension in a first direction and a second dimension in a second direction orthogonal to said first direction. In a rectangular Cartesian coordinate system the cell may include a rectangular geometry. In a circular coordinate system, the cell may include a circular geometry having a characteristic radius. The cell may have a square geometry, or any other geometry. Metal interconnects may reside above the cell geometry. A first plurality of metal interconnects may be used as local interconnects. Local interconnects may couple circuit elements within the cell to provide coupling of adjacent nodes. A second plurality of interconnects may be used as global interconnects. Global interconnects may provide circuit elements in a first unit cell to couple to circuit elements in a second unit cell. One or more interconnects may be programmable. One or more interconnects may be fixed, and not programmable.

The cell is FIG. 7B includes programmable logic elements in programmable circuit 711. The programmable logic elements may be in a multiplexer (MUX) circuit, a look-up-table (LUT) circuit, an arithmetic-logic-unit (ALU) circuit, an AND/OR logic circuit, or any other logic element used in programmable logic devices. In this discussion, a LUT circuit is used for illustrative purposes to describe use of logic elements in the programmable unit cell without limiting the scope of the invention to LUT logic. User configurable data for LUT 711 is held in configuration memory cells located over the layout area shown in FIG. 7B. In other embodiments, it may be beneficial for SRAM cells that hold LUT look-up values to reside on the Si substrate with the LUT geometry, adjacent to circuit block 711. A 2-input LUT structure may include $2^2$ SRAM cells to hold configuration data while a 4-input LUT circuit may require $2^4$ SRAM cells to hold data. In enclosed-by-referenced citations, divisible LUT structures with more than $2^N$ configuration bits (for N-input LUTs) to efficiently pack logic are disclosed. Thus, LUT 711 may be a partition-able/divisible LUT circuit. It may be a 6-input, 8-input, or a higher-input LUT circuit chosen in the architecture that best optimizes the logic cell. One or more LUT structures may be positioned in a logic cell. A plurality of configuration memory cells, including 3D SRAM as the configuration memory cell, hold data to program the look-up-values of the LUT circuit. Thus an output of a configuration memory bit must be coupled as a data input (also termed LUT value input) to a LUT circuit 711. Such an input is randomly positioned within the LUT layout area shown in 711. The output of a vertically positioned memory cell may be buffered prior to coupling it as a LUT value input to LUT circuit. A LUT circuit may be programmed to construct a logic function by changing DATA stored in configuration memory. A plurality of LUT circuits may be combined to construct larger (higher input) logic functions. A LUT circuit requires one or more primary inputs received in true and compliment signal levels, wherein the LUT circuit outputs a logic function of said inputs at one or more outputs. Such inputs and outputs may be coupled to a plurality of interconnects by programmable means.

A programmable logic cell in FIG. 7B may include a programmable input MUX such as 712, 715 and 716. The input MUX may be constructed a single stage or multiple stage MUXs. A first level of MUXs may provide a programmable coupling of a plurality of interconnects to a logic cell input. A second stage of MUXs may provide a programmable coupling of a plurality of said logic cell inputs to couple to a LUT input. Thus there may be a complex hierarchy of programmable selections for a given wire to couple as an input to a LUT logic circuit. The programmability is stored in configuration memory, located above the geometry of FIG. 7B. The programmable MUX is configured by an output of a configuration memory cell. In a preferred embodiment, the memory cell is a TFT SRAM memory cell. In a preferred embodiment, the memory cell may include a voltage divider circuit to couple selectable voltage levels different from TFT SRAM operating voltage levels. Thus a plurality of SRAM memory cells generate a plurality of outputs, each output coupled to one or more MUX transistor gates to program the input MUXs 712, 715 and 716. The programmable elements are arranged randomly within the logic cell. The input MUXs may be arranged in a specific configuration to maximize the connectivity of inputs to interconnect wires above the unit cell. In a preferred embodiment a first level of MUXs may be located around the perimeter of a logic cell. In a preferred embodiment a second level of MUXs may be grouped near the center of a logic cell. A MUX element is a switch. It provides a connect state and a disconnect state. In a connect state, the MUX couples a first node to a second node. In a disconnect state, the MUX decouples a first node from a second node. Thus reasonable electrical coupling and decoupling is required to separate a connect state from a disconnect state. In an FPGA, the memory output is required to provide this distinction, such a distinction not typically required by memory cells in memory applications.

A programmable logic cell in FIG. 7B may include a programmable register such as 714. A register may be used to implement synchronous logic computations in the logic cell. A register may be by-passed to implement asynchronous logic in a logic cell. A register may be used to store an input or an output within the logic cell, or external to the logic cell. The register may be latch, a flip-flop or any other storage device used in electronic circuits. One or more global signals may interact with the storage device. Such signals may be one or more of clock, set, reset signals. These registers may offer configurable means of locally inverting signals. In the enclosed-by-reference disclosures, configurable storage devices are shown to have alterable response sequences such as S/R or J/K or D. Thus the register 714 may be configurable to a user desired state. The inputs to the register and the outputs of the register may be configured as desirable. The logic cell may include a plurality of registers.

A programmable logic cell in FIG. 7B may include a programmable output MUX such as 717 and 718. The output MUX may be constructed a single stage or multiple stage MUXs. A first level of MUXs may provide programmable interconnects to couple to logic cell inputs. A second stage of MUXs may provide a logic cell output to couple to a buffered LUT output by a programmable means. Thus there exists a complex hierarchy of programmable selection for a given wire to couple to a buffered output of a LUT logic circuit. The programmability is stored in configuration memory, located above the geometry of FIG. 7B. The programmable MUX is configured by an output of a configuration memory cell. In a preferred embodiment, the memory cell is an SRM memory cell. Thus a plurality of SRAM memory cells generate a plurality of outputs, each output coupled to one or more MUX transistor gates to program the output MUXs 717 and 718. The programmable elements are arranged randomly within the logic cell. The output MUXs may be arranged in a specific configuration to maximize the connectivity of outputs to interconnect wires above the logic cell. A MUX element is a switch. It provides a connect state and a disconnect state. In a connect state, the MUX couples a first node to a second node. In a disconnect state, the MUX decouples a first node from a second node. Thus reasonable coupling and decoupling is required to separate a connect state from a disconnect state. In an FPGA, the memory output is required to provide this distinction; such a distinction is not typically required by memory cells in memory applications.

A programmable logic cell in FIG. 7B may include a programmable routing circuit such as 713. The routing circuit may be constructed as a single stage or multiple stage MUXs. The routing circuit may include a buffering structure to buffer signals. A routing circuit may facilitate a first wire segment to couple to a second wire segment by a programmable means. Thus an advanced programmable wire network may be created by one or more routing circuits in a plurality of logic cells. Some wires may terminate at a routing circuit. A terminating wire may couple to one or more other wires at a routing circuit. Some wires may pass-through at a routing circuit. A pass-through wire may couple to one or more other wires at a routing circuit. A routing circuit may include a first level of MUXs. The first level of MUXs may provide a programmable means of coupling a plurality of wires to a buffer input. The routing circuit may include a second level of MUXs. The second level of MUXs may provide a programmable means of coupling a buffer output to a plurality of wires. A bi-directional wire connection may be provided in a routing circuit. The routing circuit may include a cross-bar circuit. The enclosed-by-reference disclosures further detail one or more embodiments of routing circuits that may be used in the 3D FPGA. There exists a complex hierarchy of programmable selection for a given first wire to couple to a second wire such that a routing tool can efficiently route signals in an FPGA interconnect fabric. The programmability is stored in configuration memory, located above the geometry of FIG. 7B. The programmable routing circuit is configured by an output of a configuration memory cell coupled to the routing circuit. In a preferred embodiment, the memory cell is a TFT SRAM memory cell. Thus a plurality of SRAM memory cells generate a plurality of outputs, each output coupled to one or more MUX transistor gates to program the routing circuit 713. The programmable elements of routing circuit 713 are arranged randomly within the logic cell. The routing circuits may be arranged in a specific configuration to maximize the wire connectivity between logic cells.

Figure 7C:
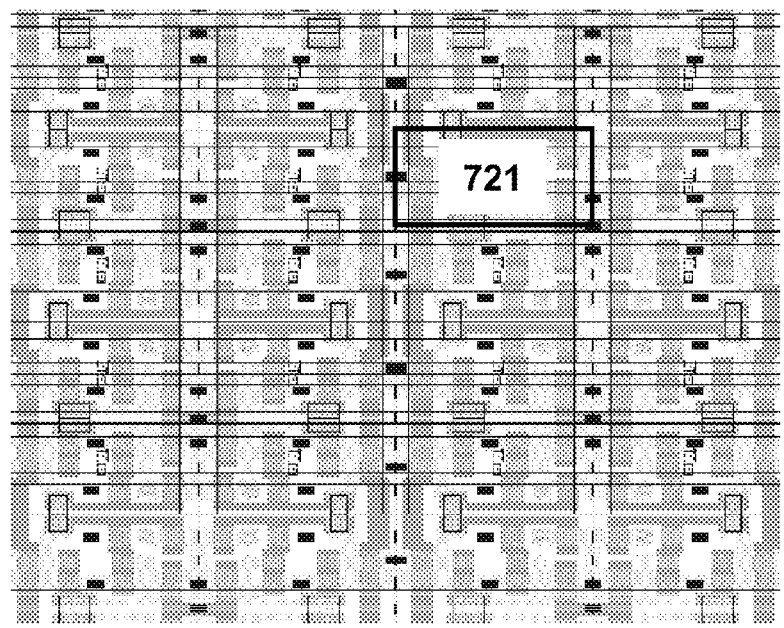
FIG. 7C shows a configuration memory array according to current invention.

A programmable logic cell in FIG. 7B may be configured by a configuration memory array as shown in FIG. 7C. The memory array includes a memory cell 721. The memory cell is replicated in an array to construct the contiguous memory array. Each memory cell has a first dimension in a first direction and a second dimension in a second direction orthogonal to the first direction. The memory array may include M-rows and N-columns, M and N integers greater than or equal to one. Thus the memory array includes M×N memory cells. The memory array is positioned above the logic cell shown in FIG. 7B. The memory array and logic cell may include substantially similar dimensions. Thus the logic cell may be viewed as having an array of unit cells, each unit cell having the dimensions of a memory cell. Each memory cell may include one or more memory elements. In one embodiment, the memory cell is an SRAM cell. In a preferred embodiment, the memory cell is an 8 transistor SRAM cell as shown in FIG. 7D. In FIG. 7D, the memory cell includes two inverters such as 731 to form a latch. It includes access transistors such as 732 to change data stored in the latch. In a global reset mode, all bits in an array are coupled to the Vss line via access transistor 732 to set all bits to a specific state—henceforth termed one state of the latch. A decoded mode is used to write a data state zero to the latch via access transistor 731. A row of data (common to a single row line) is configured simultaneously to write data states zero, or leave the data state at one as required. A resistor divide circuit composed of transistors such as 733 is used to generate an output signal from the latch. The output signal is at voltage VccL level or Vss level depending on the data state latched. VccL voltage level may be different from VccT for the TFT SRAM latch. The data state one outputs a voltage VccL, while the data state zero outputs voltage Vss. The enclosed-by-reference disclosures provide detailed configuration circuits for 3D programmable devices. In FIG. 7C, a single memory cell is efficiently replicated to construct the array. The memory cell may be placed inside a unit cell. The unit cell may include a single memory cell, or may be larger than a single memory cell. The unit cell may be replicated to form the configuration memory array, each unit cell having a memory cell placed inside the unit cell. Thus the entire unit cell area or a portion of the unit cell area maybe occupied by the configuration memory cell. Unlike in a 2D arrangement, the memory output wires couple (and route) vertically to programmable elements underneath. As a result, there are different metal density restrictions compared to the 2D arrangement. For example, vertical wires do not have lateral density restrictions as in a 2D arrangement. However, vertical wires restrict how other routing wires are positioned compared to a 2D arrangement. As disclosed herein, in the preferred embodiment, an exact layout area of memory cells (to that of the logic cell layout area underneath) positioned vertically above the logic cell is seen to provide an optimal construction of the PLD device. Furthermore as disclosed herein, the number of memory bits in the memory array is optimized to match (exactly or nearly exactly) with the total number of independently programmable elements in the logic cell. Thus, a programmable logic cell according to the current teaching has substantially identical layout geometry for the randomly positioned programmable elements as the repeating array of memory cells positioned above logic cell. In other embodiments, these layout areas may be substantially similar and not exact.

Thus according to current teachings, a novel 3D FPGA includes: a programmable logic block (FIG. 7B) having a plurality of configurable elements (in circuits 711-718) randomly positioned within the logic block; and a first array of configuration memory cells (FIG. 7C) having a configuration memory cell 721 replicated to construct the first array, the memory cell coupled to one or more of said configurable elements, a plurality of memory cells in the first array coupled to the plurality of configurable elements in logic block to program the logic block to a user specification; wherein, the first array (FIG. 7C) and the programmable logic block (FIG. 7B) have a substantially similar layout geometry and the first array is positioned substantially over the logic block.

It is easily appreciated that such a programmable logic cell and the configuration memory array above the logic cell may be replicated to form a programmable logic array. The individual memory arrays of each logic cell merge with others to form one contiguous larger efficient memory array. The logic cells further group to generate a larger programmable logic area comprising randomly distributed programmable elements. Thus according to current teachings, a novel 3D FPGA further includes: a plurality of programmable logic cells (FIG. 7B), each of the logic cells having a randomly distributed plurality of programmable elements (in circuits 711-718), the plurality of logic cells configured by a contiguous array of configuration memory cells (each cell such as in FIG. 7D), wherein: the array of memory cells includes a substantially similar layout geometry as the plurality of programmable logic cells; and the array of memory cells is positioned over the plurality of programmable logic cells, a plurality of memory cells in the array coupled to the programmable elements to program the plurality of logic cells to a user specification. Thus a 3D FPGA is easier to construct by duplicating an efficiently constructed very small single programmable logic cell.

In one embodiment of the 3D construction, the array of memory cells in FIG. 7C is positioned over the plurality of programmable elements in logic cell of FIG. 7B. In a preferred embodiment, a plurality of metal layers is positioned between the logic elements and memory cells. Such an arrangement requires special construction of the metal layers positioned between the two circuit blocks.

One embodiment of a metal construction to vertically couple configuration memory to programmable elements is shown in FIG. 8. In FIG. 8, a metal stub such as 801 is provided to couple one output of a memory cell such as in FIG. 7D (cell 721 in the array of memory cells in FIG. 7C) to one or more programmable elements in FIG. 7B configured by that single bit. The metal stub 801 is replicated in an array fashion. A very small metal unit cell 803 may be constructed having a dimension 805 in a first direction and a dimension 804 in a second direction orthogonal to the first direction. These dimensions are made to match with the memory array dimensions of configuration memory cells positioned above the coupling metal layer. Region 803 shows such a metal unit cell wherein a metal stub is positioned in a first region and a continuous metal line is positioned in a second region. The metal line spans the unit cells such that when a metal array is constructed, it forms a continuous global metal line. In a first embodiment, a metal line such as 802 is positioned between two adjacent stubs in the second direction as shown in FIG. 8. In a second embodiment, a metal line such as 802 is positioned between two adjacent stubs in the first direction, as if FIG. 8 is rotated 90 degrees clockwise. A metal line may be used as a power bus, a ground bus, a clock signal or any other global control signal line. Thus, a metal coupling layer (shown in FIG. 8) to couple outputs of an array of memory cells (shown in FIG. 7C) to programmable elements of a programmable logic cell (shown in FIG. 7B) in a 3D Programmable Logic Device (PLD), includes: a plurality of metal stubs 803 arranged in an array having a first dimension 805 in a first direction and a second dimension 804 in a second direction, said first and second dimensions identical to the dimensions of the memory cell in the memory cell array, wherein a metal bus is positioned between two adjacent stubs in the first or second direction. Such a metal layer provides efficient coupling of memory arrays in a 3D FPGA to underlying logic, and provides adequate metal for power, ground and global signal routing required in 3D constructions.

FIG. 8B shows an adaptation of a metal pattern to be generated by CAD software. In this, no human intervention is needed to define the metal pattern. In FIG. 8B, a first group of metal lines 810 have fixed predetermined positions, and are capable of coupling to a first voltage. The first voltage may be power or ground or any other voltage. A second group of metal lines 811 are capable of coupling to a second voltage. The second voltage may be power or ground or any other voltage. It has a set of fixed metal tabs 820 at predetermined positions. These fixed metal lines and tabs are common, and always present on any metal pattern. FIG. 8B has two sets of selectable metal patterns at predetermined positions. A first set of selectable metal tabs 830 at predetermined positions has each metal tab coupling a said fixed metal tab 820 to a first group metal line 810. A second set of selectable metal tabs 840 at predetermined positions has each metal tab coupling a said fixed metal tab 820 to a said second group metal line 811. As these metal tabs have predetermined positions, selecting which tabs to keep and which tabs not to keep provides a means of coupling a fixed metal tab 820 to either a first voltage line 810 or a second voltage line 811. Thus a first subset of metal tabs is selected from the first set 830, and a second subset of metal tabs is selected from the second set 840. These first and second subsets are selected by a CAD software algorithm. First it reads a binary data set where each data point in the set is uniquely matched to a fixed metal tab 820. If there are N data points, then there are N fixed metal tabs 820. The order of data in the data-string can be matched 1:1 to corresponding fixed metal tabs by a look-up-table arrangement. A first 830 or second 840 set metal tab is selected based on a first (say logic zero) or second (say logic one) data value respectively. When 810 is ground, metal tab 830 couples fixed tab 820 to ground. When 811 is Vcc, metal tab 840 couples fixed tab 820 to Vcc. Thus a metal pattern is fully defined by simply selecting selectable metal tabs 830 & 830 according to a binary data file—also known as bit-stream. This bit-stream is further generated by a software program of a programmable logic device by place and route of a user design. The CAD generation of the metal pattern avoids human error, involves no physical time, secure, and preserves confidentiality of design. It is fully automated.

Figure 9A:
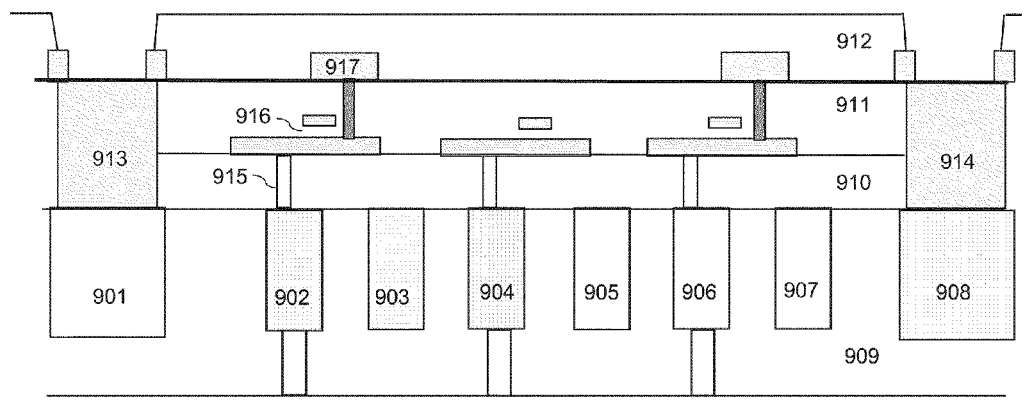
FIG. 9A shows the cross-sectional view of top metal and RAM configuration in 3D FPGA.

A cross sectional view of a first embodiment of the 3D FPGA according to current teachings is shown in FIG. 9A. In that, metal stubs 902, 904, 906 provide the coupling between memory array above and programmable elements below. Metal lines 903, 905, 907 are positioned between adjacent stubs. A plurality of memory cells 916 is positioned above the coupling metal layer. An output 915 of memory cell 916 is coupled to a metal stub 902, which is further coupled to one or more programmable elements below not shown in the cross sectional view. The coupling between memory cell 916 and metal stub 902 includes a via 915. In between metal stubs 902 and 904, a long metal line 903 running perpendicular to the view is used for power, ground or global control signals. In other embodiments, a plurality of parallel global control metal lines may be positioned between two adjacent metal stubs. A memory cell 916 may include a plurality of memory elements. It may include a plurality of transistors, specifically a plurality of thin-film-transistors. It may include one or more configurable elements capable of providing a logic input to the metal stub 902. Incorporated-by-reference disclosures describe thin-film transistors, inverters and memory cells suitable for 3D SRAM constructions. The memory cells 916 may include RAM or ROM memory elements. A RAM memory cell 916 may further include additional metal lines such as 917 to fully construct a memory array. A metal line 917 may be positioned above a power and ground metal layer comprising 901-908 shown in FIG. 9A. Metal regions 901 and 908 may be used as pad regions for the 3D FPGA. A pad region such as 901 shown may require bonding to other IC devices when constructing systems with multiple chips. In one embodiment, the pad region 901 & 913 may be void of memory elements positioned above the pad regions. In yet another embodiment, a metal region 913 may be positioned similar to metal region 917 above memory cell 916 and coupled to pad region 901. Such a metal region 913 may form a re-distributed-pad region. The re-distributed-pad region may be coupled to a specific pad-region 901 by the distribution metal layer. In a preferred embodiment, the memory cells 916 form a regular memory array above the metal stub array 903/905/907 forming an easy to couple coupling scheme. The metal stubs 903/905/907 may further couple to underlying programmable elements through a system of vertical and horizontal connecting wires. In the described construction, each coupling terminates at a high impedance node in the programmable logic circuit, and the wire capacitance acts to stabilize the control voltage on the configured node.

Figure 9B:
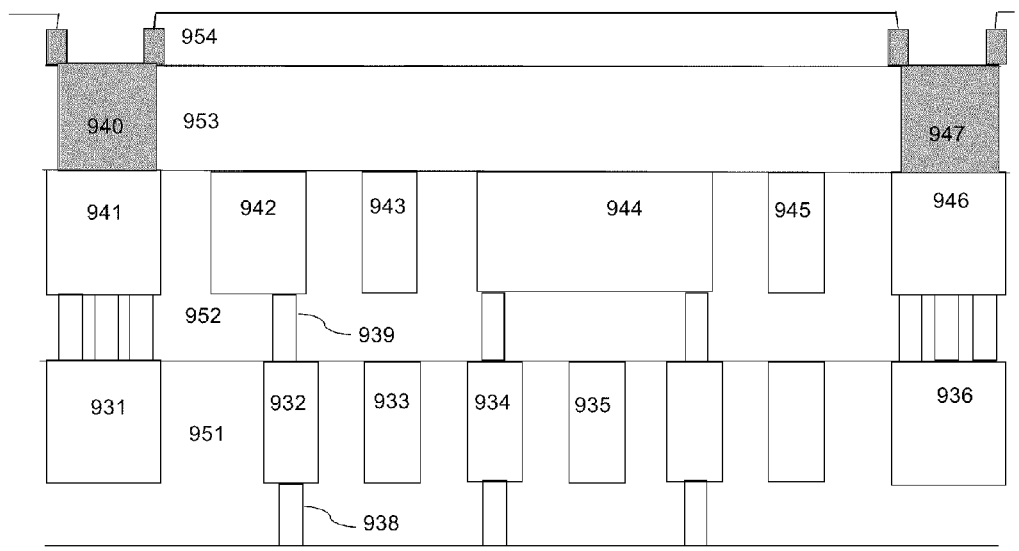
FIG. 9B shows the cross-sectional view of top metal and ROM configuration in 3D FPGA.

A cross sectional view of a second embodiment of the 3D FPGA according to current teachings is shown in FIG. 9B. In that, a RAM element (in FIG. 9A) is replaced by a ROM element. In the embodiment, a ROM element is simply a metal connection—connected to a power supply or a ground supply. A ROM element may be a RAM element hard-wired to always store a specific data value (it is easily seen that the two sides of a latch can be shorted to power supply and ground supply such that the latch always retains a specific data value). In FIG. 9B, metal lines 942, 944 carry power, while metal lines 943, 945 carry ground. Metal stub 932 may be coupled to power (metal line 942) or ground (metal line 943). Metal stub 934 may be similarly coupled to power (metal line 944) or ground (metal line 943). Thus a customized metal pattern provides the configuration for programmable elements below. A separate metal layer as shown in FIG. 9B comprising wires 942-945 offers the capability of providing different power voltage to stubs 932, 934 compared to power voltage of underlying logic. If the same power and ground voltages suffice, no extra metal layer such as 942-945 is needed; instead power and ground voltages in metal lines 933, 935 are used to power the stubs to required voltage level. Thus metal stubs 932, 934 may be customized to obtain a pre-determined data values to program programmable elements below. In between metal stubs 932 and 934, a long metal line 933 running perpendicular to the view is used for power, ground or global control signals. In other embodiments, a plurality of parallel global metal lines may be positioned between two adjacent metal stubs. Incorporated-by-reference disclosures describe converting RAM based PLD devices to ROM based PLD devices, both preserving a timing characteristic, or achieving a higher performance conversion, or achieving a lower power conversion. Metal regions 941 and 946 may be used as pad regions for the 3D FPGA. A pad region as shown may require bonding to other IC devices when constructing systems having multiple chips. In one embodiment, the pad region 941 & 946 may be positioned along the perimeter of the PLD. In another embodiment, the pad regions may be positioned in a grid over the top surface of the PLD. A re-distribution metal layer may be used to couple perimeter pad-regions (such as 931) to re-distributed pad regions (such as 940) above the metal stubs regions 932. The metal stubs 932/934 may further couple to underlying programmable elements through a system of vertical and horizontal connecting wires. In the described construction, each coupling may terminate at a high impedance node in the logic circuit, and the wire capacitance may act to stabilize the control voltage on such capacitive configurable nodes. Another advantage in the current teaching is that no switching signals traverse the vertically configured wire segment and the configuration wire segments can absorb as many detours as necessary to maintain signal integrity of timing critical wires in the FPGA.

Figure 10A:
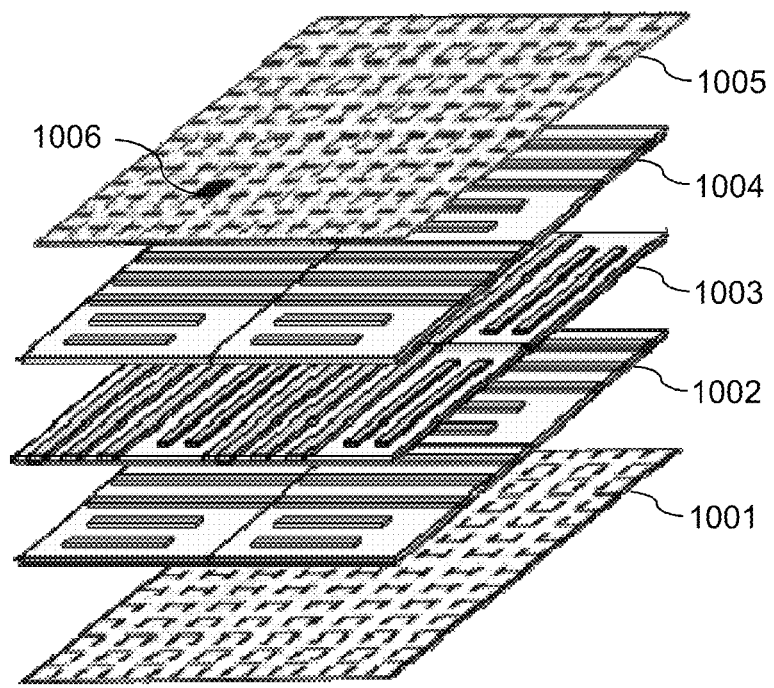
FIG. 10A shows a 3D view of substrate circuits, intermediate metal layers & top configuration memory.

FIG. 10A shows a preferred embodiment of constructing programmable elements, programmable interconnects and vertically connected configuration memory. Transistors are used in module layer 1001 to construct circuits. Such circuits include AND, NAND, OR type logic circuits, inverters, buffers, drivers type signal restoration circuits, latches, flip-flops, memory type storage circuits, MUXs, switches, cross-bars type connectivity circuits, LUTs, ALUs, DSP, CPU type of computation circuits, PLL, DLL, AtoD, DtoA type analog circuits and IP blocks. Thus module layer 1001 includes programmable and non-programmable circuit components that are found in typical integrated circuits. Module layer 1001 may include one or more metal layers to provide some level of interconnect among the transistors. Module layer 1001 may include one or more configurable elements, and/or one or more components that form a part of configuration circuits required to configure one or more configurable elements within module layer 1001. A plurality of metal interconnects in module layers such as 1002, 1003 and 1004 are provided to interconnect circuit blocks within module layer 1001. In a preferred embodiment, a majority of interconnect wires in module layer 1002 traverses a first direction. A majority of interconnect wires in module layer 1003 traverses a second direction orthogonal to said first direction. A majority of interconnect wires in module layer 1004 traverses the first direction. Similarly a plurality of metal module layers is vertically arranged to provide enhanced routing between circuit nodes in module layer 1001. Such interconnect wires, though present, are not shown in FIG. 9A. A module layer 1005 includes a plurality of configuration memory cells such as 916 in FIG. 9A. (The metal stub layer 901-908 in FIG. 9A is not shown in FIG. 10A). A configuration memory cell may include a unit cell area 1006. The unit cell 1006 is replicated in a contiguous array to construct the module layer 1005. Each cell in module layer 1005 is coupled to one or more programmable elements in module layer 1001—this coupling is not shown in FIG. 10A. To facilitate the coupling, novel metal layout styles are needed, which are discussed next.

A metal module layer such as 1002 includes a plurality of repeating regions. Within a region, a first portion includes substantially long metal lines. The long metal line may span the entire length, or most of the length in either said first r second direction. Within the repeating region, a second portion includes substantially short metal lines. The short metal lines may span the length of a unit cell 1006, a few unit cells 1006, or a fraction of a unit cell. These wires may traverse in the first and second direction as needed. These short wires facilitate vertical interconnection of configuration memory cells to underlying programmable elements. Thus it should be noted that the cell 1006 vertically couples to a short wire in metal module layer 1004, then couples to a short metal wire in module layer 1003, so on and so forth until it couples to the programmable logic elements in module layer 1001. Furthermore, these short wires facilitate coupling of long wires to switch elements in module layer 1001. For example, if a long wire in module layer 1003 has to couple to a long wire in module layer 1002, it must first traverse to a first node of a switch in module layer 1001, and a second node of the switch must traverse back. This wire path may carry switching signals critical to the design. The shown arrangement allows a wire to go literally vertically down through the short wire region to minimize timing delays associated with longer routing excursions of 2D FPGAs.

Figure 10B:
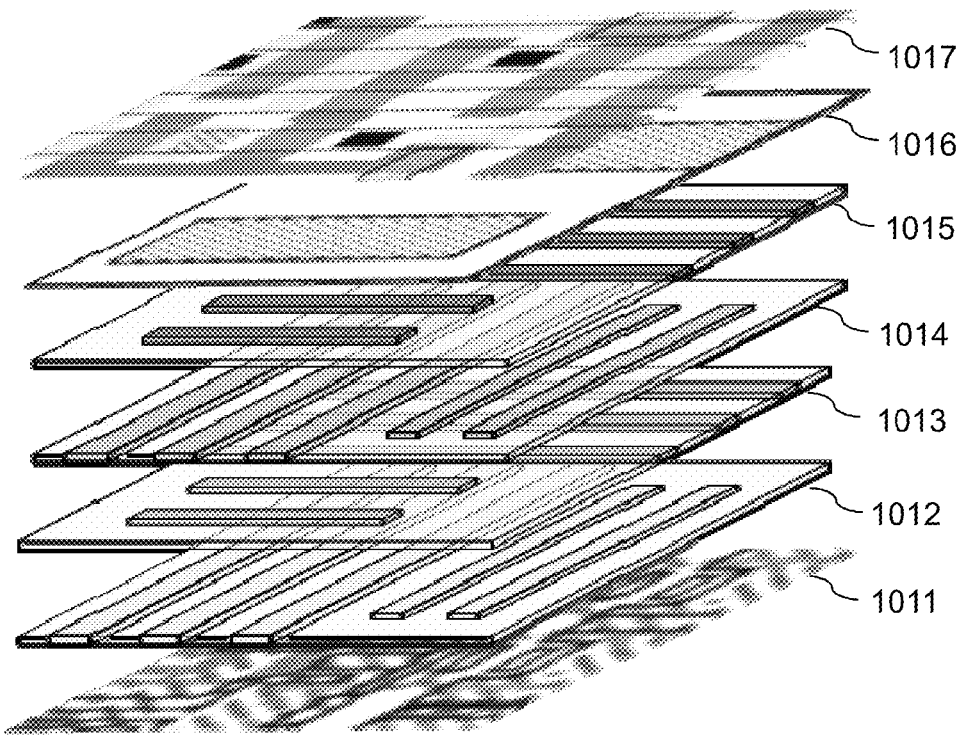
FIG. 10B shows a unit cell replicated to construct FIG. 10A.

A second aspect of the novel chip construction is disclosed next. Within the 3D structure shown in FIG. 10A, a smaller vertical column comprising a unit cell area such as 1006 is specially crafted in every module layer (such as 1002 thru 1004) to include vertically aligned structures. A single unit cell 1006 from the upper most configuration module layer 1005 to lower most logic transistor module layer 1001 is shown in FIG. 10B to illustrate this novel 3D construction in more detail. The top configuration memory module layer 1017 (similar to 912 in FIG. 9A) now includes a single memory cell. It may be a 4T or 6T or 8T SRAM cell, or any other memory element. In FIG. 10B, the 8T-SRAM cell of FIG. 7C and FIG. 7D is shown for illustrative purposes. The metal layer 1016 (same as 901-908 in FIG. 9A, which is not shown in FIG. 10A) includes metal stubs 902, 904 as shown in FIG. 9A. The metal stub in module layer 1016 is coupled to SRAM cell output in module layer 1017 (coupling not shown). The metal line in module layer 1016 spans the entire length such that repeating cells form a long metal line. In other embodiments, a plurality of longer parallel metal lines may be constructed in module layer 1016. Another module layer similar to module layer 1016 but having metal running in a direction orthogonal to metal in module 1016 is positioned below module 1016. For convenience, that module layer is not shown in FIG. 10B. The wires in module layer 1015 are arranged to include a first region and a second region. In the first region, a plurality of wires run full length of the unit cell parallel to each other. These wires form long wires when the cells are repeated in an array. In the second region, a plurality of wires run partial cell distances. These wires are used for local interconnect, and may run as needed in no particular preselected direction. Similarly unit cells in module layers 1014 thru 1012 have similar wire arrangements. In a preferred embodiment, the long wires in vertically adjacent module layers are arranged orthogonal to each other. In other embodiments, a first two consecutive module layers may have parallel long interconnects, while a second two consecutive module layers may have parallel long interconnects orthogonal to said first two consecutive module layers. Metal layers below module layer 1012 are not shown in FIG. 10B and may be imagined as if included in module layer 1011. In module layer 1011, within the unit one or more transistors are located. This is a non-repeating geometry. A plurality of unit cell geometries (such as 1011) containing non identical elements form the complete logic block that occupies module layer 1001 in FIG. 10A. Thus a repeating metal and configuration cells fully couple and configure a system of randomly positioned programmable elements in module 1011 and module 1001 in FIG. 10.

Thus a vertically configured programmable logic device (PLD) in FIG. 10A includes: a unit cell 1006 wherein the unit cell boundary includes a first dimension in a first direction (such as 805 in FIG. 8) and a second dimension in a second direction (such as 804 in FIG. 8) orthogonal to said first direction; and an array of configuration memory cells 1005, the array constructed by placing a memory cell within the unit cell 1006 boundary and replicating the unit cell to form the memory array; and a plurality of programmable elements randomly positioned in a geometry 1001 substantially similar to the geometry of the configuration memory cell array 1005; and an array of first metal cells 1004, the array constructed by replicating a first metal cell of said unit cell 1006 dimensions in an array, the first metal cell further comprising: a first region with one or more parallel metal bus lines (such as 802 inside unit cell 803 in FIG. 8), a bus line extending between opposite cell boundaries in the first or second direction to form a global bus wire; and a second region with a metal stub (such as 801 inside unit cell 803 in FIG. 8) coupled to a configuration memory cell positioned above the first metal stub and one or more of said programmable elements positioned below the first metal stub.

The device of FIG. 10A, further includes: an array of second metal cells 1003, the array constructed by replicating a second metal cell of said unit cell 1006 dimensions in an array, the second metal cell further comprising: a first region with two or more parallel metal lines, a metal line extending between opposite cell boundaries in the first or second direction to form global routing wires; and a second region with metal stubs and metal lines to facilitate vertical routing of configuration memory cells and signals. The vertically positioned unit cell is shown in FIG. 10B.

The unit cell in FIG. 10B includes: a substrate region 1011 comprising a portion of circuit blocks having programmable elements; and a configuration memory cell 1017 coupled to one or more of the programmable elements, wherein: the memory cell is positioned substantially over the substrate region; and the memory cell and substrate region geometries are substantially similar. The unit cell further includes: a metal cell 1016 having the configuration memory cell 1017 dimensions and a metal stub coupled to the configuration memory cell 1017 and to one or more of said programmable elements, wherein: the metal cell is positioned below the memory cell and above the substrate region; and the metal cell further includes one or more metal lines adjacent to the metal stub.

To construct larger programmable logic tiles, the structure of FIG. 10A is further repeated in an array fashion. Thus every programming need of the region 1001 must be satisfied by the configuration cell density in module layer 1005. Now efficiently positioned arrays of memory cells can effectively configure randomly positioned programmable elements in the vertically coupling configuration scheme. When structure in FIG. 10A is repeated in an array fashion, larger efficiently positioned memory cell arrays are generated, such arrays efficiently programming higher densities of programmable elements in the lower fabric.

Figure 11A:
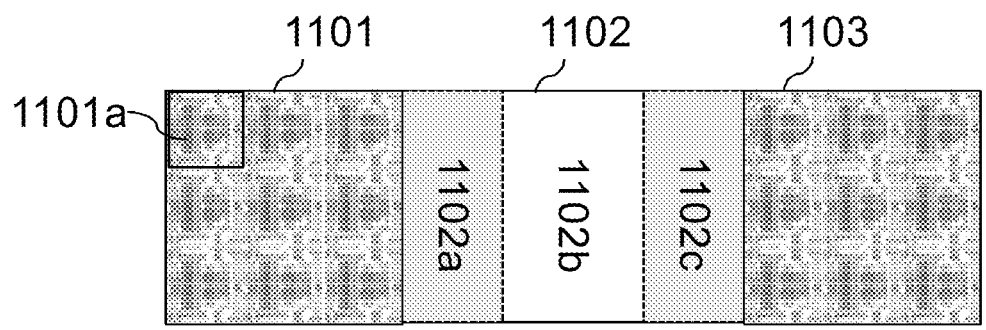
FIG. 11A shows an IP block positioned between two programmable logic blocks.

Prior art FPGA products disclosed in IDS references typically combines programmable logic blocks with IP cores. Each FPGA vendor positions the IP blocks in a preferred position within the programmable logic fabric and couple IP & logic both to the interconnect matrix. Such IP integration in the novel 3D products is disclosed next. FIG. 11A shows a first programmable logic tile 1101, a second programmable logic tile 1103 and an IP block 1102 positioned between said two programmable logic tiles. The programmable logic tile 1101 may include a plurality of programmable logic units 1101a, the programmable unit comprising programmable elements with programmable logic elements and programmable routing elements. In a preferred embodiment, the tile 1101 is constructed by replicating a unit logic cell 1101a in an array. While FIG. 11A shows a 3×3 array for illustrative purposes, the tile may have fewer or greater number of unit logic cells. The IP block 1102 includes three regions: a first region 1102 adjacent to tile 1101, a second center region 1102b, and a third region 1102c adjacent to tile 1103. The IP block is further constructed such that region 1102b is substantially void of any programmable elements. As an example, if IP block 1102 is a dual-port memory block, region 1102b may include a plurality of dual-port memory bits, the entire region comprising no configurable nodes coupling to configuration memory bits. All the configuration elements that are required to configure IP block 1102 are arranged in region 1102a and 1102c. Thus region 1102a in IP block 1102 includes a plurality of programmable elements, such as logic and routing elements, one or more said elements coupled to a configuration memory cell. Similarly region 1102c in IP block 1102 includes a plurality of programmable elements, such as logic and routing elements, one or more said elements coupled to a configuration memory cell. In the example of dual-port memory IP, such configuration bits may offer the capability to vary the width and depth of the memory block. Such configuration bits may further offer to combine a plurality of physical memory blocks into a single logical memory block. The advantage of such an arrangement will become clear during the construction of configuration memory to program these programmable elements.

Figure 11B:
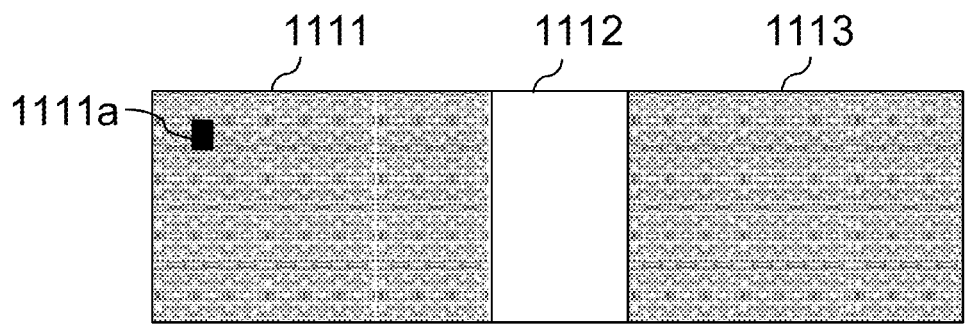
FIG. 11B shows a configuration memory array to program programmable elements in FIG. 11A.

FIG. 11B shows the configuration memory construction to program logic elements in programmable tiles 1101, 1103 and IP block 1102. The configuration memory arrangement has three regions: regions 1111 and 1113 comprising configuration memory bits, and region 1112 significantly void of any configuration memory bits. A first portion of memory bits in region 1111 programs the programmable elements in tile 1101. A second portion of memory bits in region 1111 programs the programmable elements in region 1102a of IP block 1102. The two memory bit portions in region 1111 combine to form one contiguous array of cells; a single memory cell shown in 1111a. This forms a very efficient larger memory cell array compared to two separated memory blocks, or random memory. Thus unlike in prior art configuration memory arrangements, the construction of IP blocks in the fashion described, and positioning of a programmable tile adjacent to the IP block allows randomly positioned programmable elements in both of said circuit components to be programmed by a single contiguous array of memory elements. It is easily noted that the contiguous array of memory elements in region 1113 programs all programmable elements in IP region 1102c and programmable tile 1103.

Figure 11C:
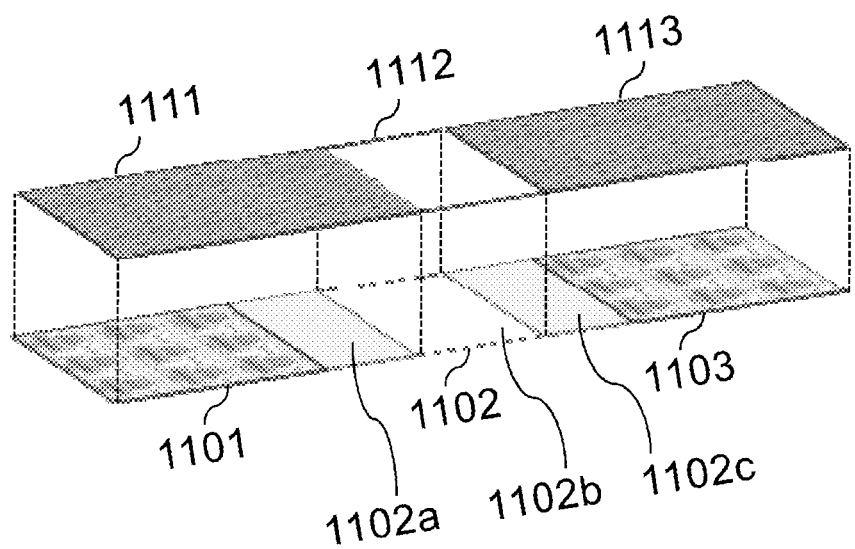
FIG. 11C shows a 3D view of FIGS. 11A & 11B arranged one above the other.

FIG. 11C shows the 3D positioning of the configuration memory plane vertically above the programmable tile and IP blocks. The vertical configuration with interconnects (such as layers 1012-1015 in FIGS. 10A & 10B) is not shown for simplicity. Such interconnects include via and wire structures that couple a single configuration bit in the configuration plane (1111 & 1113) to one or more programmable element in the silicon plane (1101 & 1102a, 1102c, 1103). It is further noted that the vertical region between 1112 and 1102b is utilized in the interconnect layers to positioned wide power and ground buses that require a significant metal area. In a first embodiment vertical regions between 1112 and 1102b also includes driver circuit components and wiring components required to write and read data to and from configuration memory plane and silicon plane. Thus, the three dimensional programmable logic device (PLD) of FIG. 10C includes: one or more intellectual property (IP) cores 1102, each IP core comprising: a fixed circuit region 1102b, and a programmable circuit region 1102a having a plurality of programmable elements to configure the IP core; and a programmable logic block array region 1101 comprising: a plurality of substantially identical programmable logic blocks (such as 1101*a* in FIG. 11A) replicated to form the array, each said logic block further comprising a plurality of programmable elements; and a programmable region (region comprised of 1101 and 1102*a*) comprising randomly positioned programmable elements of said programmable logic block array region and one or more of said IP block programmable circuit regions; and a configuration memory array 1111 comprising a configuration memory cell (such as 1111*a* in FIG. 11B) replicated to construct the array, a memory cell coupled to one or more of said programmable elements in the programmable region, the memory array programming the programmable region, wherein: the memory array 1111 is positioned substantially above the programmable region; and the memory array geometry is substantially similar to the programmable region.

Figure 12A:
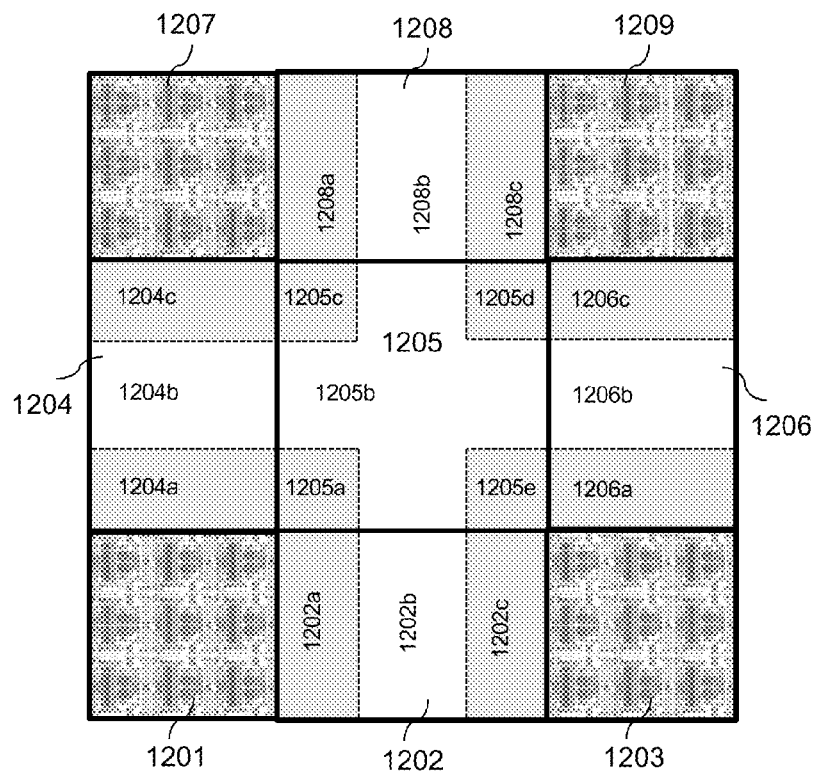
FIG. 12A shows a plurality of IP blocks positioned with a plurality of programmable logic blocks.

FIG. 12 illustrates the combination of a plurality of programmable tiles and IP blocks to achieve the three dimensional vertical configuration advantages according to the current teachings. FIG. 12A shows the layout arrangement of four programmable tiles 1201, 1203, 1207 & 1209, each comprising a plurality of programmable logic blocks as shown in FIG. 7B. Thus each of the tiles is similar to tiles 1101 & 1103 shown in FIG. 11A. Each of the tiles 1201, 1203, 1207 & 1209 further include a plurality of programmable elements randomly positioned on the substantially rectangular geometry of the tile, each said programmable element constructed on the silicon substrate layer. FIG. 12A further shows five IP blocks 1202, 1204, 1205, 1206 & 1208. The substantially rectangular IP blocks comprise geometries matched with the programmable tiles such that when positioned in between the programmable tiles as shown in FIG. 12A, the combined geometries include a substantially rectangular geometry as shown. Thus FIG. 12A illustrates a very compact and carefully crafted silicon substrate foot-print that achieves significantly smaller Si foot-print compared to other methods of combining the specified circuit blocks. IP blocks 1202, 1204, 1206 & 1208 are similar in construction to IP block 1102 discussed in FIG. 11A. In one example, it may be four similar IP blocks 1102 of identical functionality as shown in FIG. 11A. In another example it may be four different functional IP blocks, each constructed in the manner described in FIG. 11A. Each of the IP blocks 1202, 1204, 1206 & 1208 include programmable elements such as programmable logic elements and/or programmable routing elements as well as non-programmable circuit components. In IP block 1202, the programmable elements are positioned in region 1202*a* and 1202*c*, while the non-programmable circuit components are positioned in region 1202*b*. IP block 1202 is positioned in-between programmable tiles 1201 and 1203 such that region 1202*a* is adjacent to tile 1201, and region 1202*c* is adjacent to tile 1203 as shown in FIG. 12A. In FIG. 12A, it can be seen that IP block 1204 is positioned in-between programmable tiles 1201 and 1207 such that region 1204*a* is adjacent to tile 1201, and region 1204*c* is adjacent to tile 1207. In FIG. 12A, it can be seen that IP block 1206 is positioned in-between programmable tiles 1203 and 1209 such that region 1205*a* is adjacent to tile 1203, and region 1206*c* is adjacent to tile 1209. In FIG. 12A, it can be seen that IP block 1208 is positioned in-between programmable tiles 1207 and 1209 such that region 1208*a* is adjacent to tile 1207, and region 1208*c* is adjacent to tile 1209. IP block 1205 is constructed such that it includes programmable elements in the four corner regions 1205*a*, 1205*c*, 1205*d* & 1205*e*, while having non programmable circuit components in the remaining region 1205*b* as shown in FIG. 12A. When IP block 1205 is positioned at the center in FIG. 12A, each of the corner programmable regions combine with neighboring programmable regions to form a contiguous larger programmable region. For example, regions 1201, 1202*a*, 1205*a* and 1204*a* form a first programmable quadrant comprising randomly positioned programmable elements within said region. Similarly, regions 1203, 1202*c*, 1205*e* and 1206*a* form a second programmable quadrant comprising randomly positioned programmable elements within said region. Similarly, regions 1209, 1206*c*, 1205*d* and 1208*c* form a third programmable quadrant comprising randomly positioned programmable elements within said region. Finally, regions 1207, 1204*c*, 1205*c* and 1208*a* form a fourth programmable quadrant comprising randomly positioned programmable elements within said region. As can be seen in FIG. 12A, non programmable circuit components in regions 1204*b*, 1205*b*, 1202*b*, 1206*b* & 1208*b* combine to form horizontal and vertical tracks in-between the four programmable quadrants. Thus FIG. 12A represents a Si substrate portion (or a Si substrate region) of a 3D semiconductor device comprising programmable tiles and IP blocks. Many such regions may exist in the 3D semiconductor device.

Figure 12B:
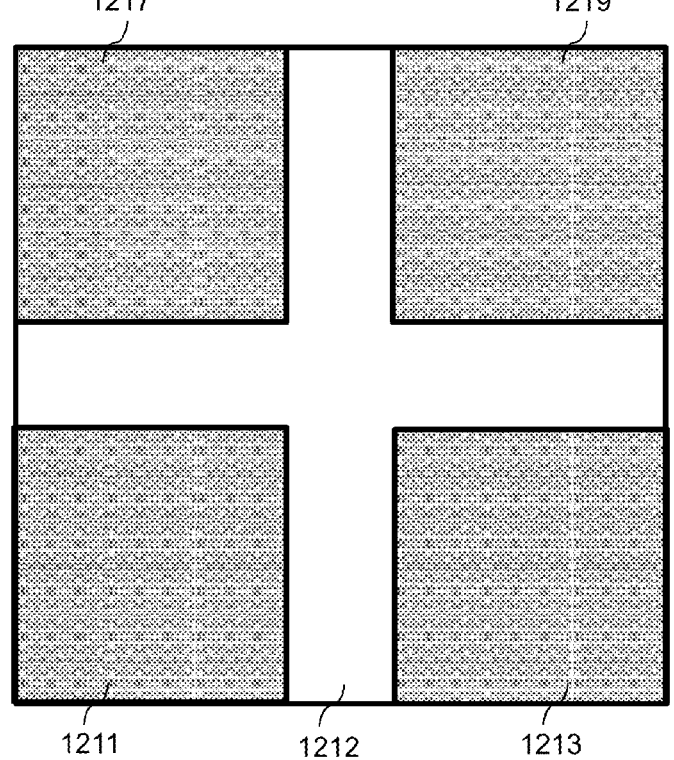
FIG. 12B shows the configuration memory arrays constructed to program FIG. 12A.

Vertically positioned configuration memory elements to program programmable elements in FIG. 12A are shown in FIG. 12B. There are four contiguous configuration memory arrays 1211, 1213, 1219 and 1217, each programming the programmable elements in said first, second, third and fourth quadrants of FIG. 12A respectively. What is novel in FIG. 12B is in the manner in which configuration memory elements form a contiguous array 1211 to program programmable elements in a plurality of varied circuit underneath: programmable elements in tile 1201, programmable elements in IP block regions 1202*a*, 1205*a* & 1204*a* (from three different IP blocks). This allows for very efficient layouts of contiguous configuration memory arrays to program underlying programmable elements that are pre-segregated to make the integration of programmable logic tiles with IP blocks encountered in programmable logic devices feasible. Region 1212 in FIG. 12B is substantially void of configuration memory elements. Such regions are used for wide metal tracks needed for power and ground distributions, as well as circuit components required to write/read data to the vertical configuration memory layer.

Figure 12C:
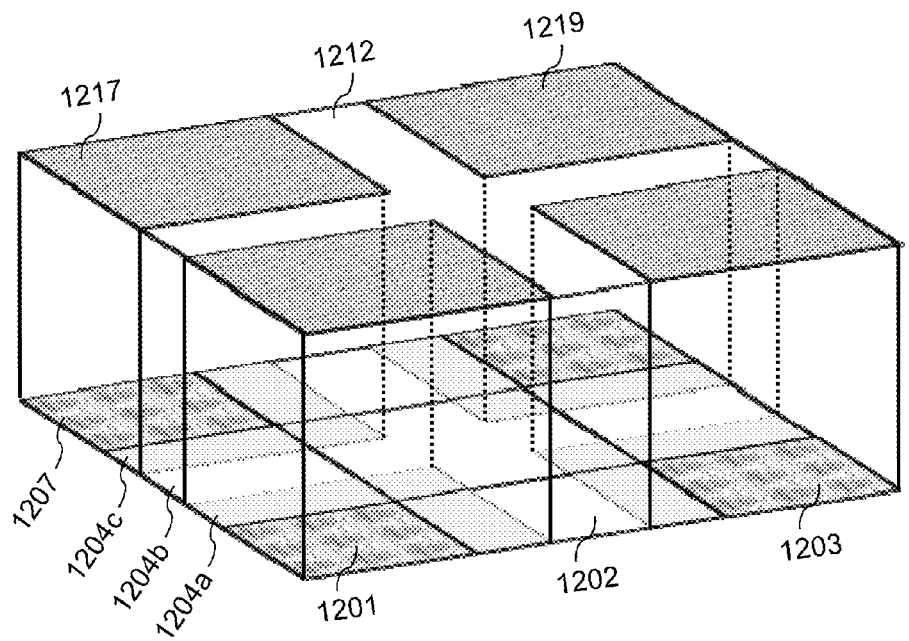
FIG. 12C shows the 3D arrangement of FIGS. 12A & 12B.

The 3-dimensional construction of FIG. 12A and FIG. 12B is shown in FIG. 12C. In that, FIG. 12A forms a first circuit layer at the bottom while FIG. 12B forms a second circuit layer on top of the first layer. It may be easily visualized that the layer positions may be reversed. There may be a plurality of metal layers between said two layers, such layers not shown in FIG. 12C for simplicity. Furthermore it may be easily visualized that metal layers may exist above the shown top layer, or no metal layers may exist in between the shown two layers. In a given quadrant, a configuration memory element is coupled to one or more programmable elements underneath in the same quadrant. The memory elements contiguously arranged in an array in the first quadrant may completely (or near completely) configure all the programmable elements randomly distributed in the first quadrant at the bottom layer. These programmable elements may belong to a combination of circuit blocks such as programmable logic circuits, IP circuits and I/O circuits. Thus, FIGS. 12 A-C shows a portion of a three dimensional programmable logic device (PLD), comprising: a programmable logic block (1204*c*, 1205*c*, 1207 & 1209*a*) having a plurality of configurable elements positioned randomly within the logic block; and a first array of configuration memory cells 1217 having a configuration memory cell (such as memory cell 1111a in FIG. 11B) replicated to construct the first array, a memory cell coupled to one or more of said configurable elements, a plurality of memory cells in the first array coupled to the plurality of configurable elements in logic block to program the logic block to a user specification; wherein, the first array 1207 and the programmable logic block (1204c, 1205c, 1207 & 1209a) have a substantially similar layout geometry, and the first array is positioned substantially over the logic block.

Figure 13A:
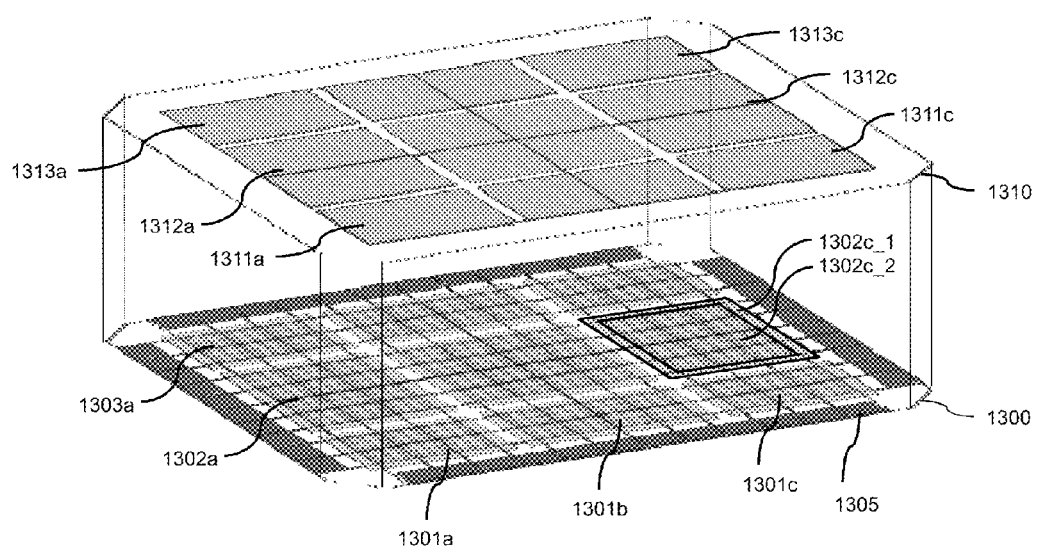
FIG. 13A shows a 3D FPGA/PLD wherein logic is programmed by vertical memory.
Figure 13B:
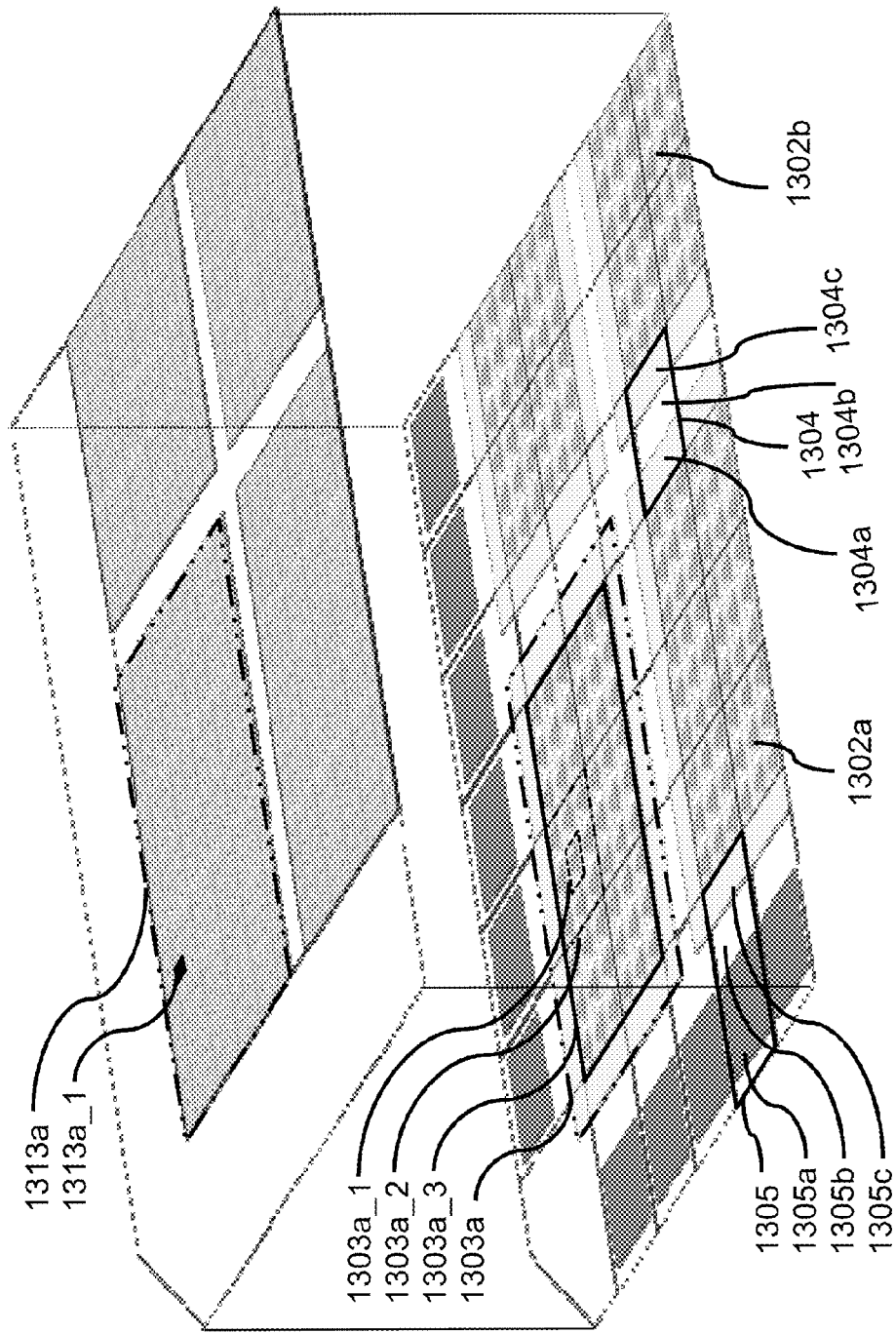
FIG. 13B shows an enlarged view of a portion of FIG. 13A.

FIGS. 13A & B shows a novel 3D PLD. FIG. 13B is an enlarged view of a portion of FIG. 13A to better illustrate the circuit blocks. For illustrative purposes, only a few components encountered in typical PLDs are shown. FIG. 13 show a plurality of programmable I/O cells such as 1305, a plurality of programmable IP block such as 1304, a plurality of logic blocks such as 1303a_1 or 1303a_2 or 1303a_3. The logic block may be a logic unit (1303a_1) or a logic block (1303a_2) or a logic array block (1303a_3). Thus FIG. 13 is a three dimensional programmable logic device (PLD), comprising: a plurality of I/O cells 1305, each I/O cell comprising: a fixed circuit region (1305a & 1305b); and a programmable circuit region (1305c) having a plurality of programmable elements to configure the I/O cell (1305); and one or more intellectual property (IP) cores 1304, each IP core comprising: a fixed circuit region (1304b); and a programmable circuit region (1304a or 1304b) having a plurality of programmable elements to configure the IP core; and a programmable logic block array region (1303a 3) comprising: a plurality of substantially identical programmable logic blocks (1303a_2 or 1303a_1) replicated to form the array, each said logic block further comprising a plurality of programmable elements; and a programmable region 1303a comprising randomly positioned programmable elements of said programmable logic block array region 1303a_3, the one or more of IP core programmable circuit regions (such as 1304a, but adjacent to 1303a_3) and the one or more of I/O cell programmable circuit regions (such as 1305c, but adjacent to 1303a_3); and a configuration memory array 1313a comprising a configuration memory cell 1313a_1 replicated to construct the array, a memory cell coupled to one or more of said programmable elements in the programmable region, the memory array 1313a programming the programmable region 1303a, wherein: the memory array is positioned substantially over the programmable region; and the memory array and programmable region geometries are substantially identical.

In one embodiment, a 3D device such as a 3D PLD or 3D FPGA provides shared pins to reduce pin count and thus reduce cost. In other embodiments, one or more configuration signals are multiplexed with input/output pins of the 3D device to provide multi-function pins. Typically, the multi-functional pin is coupled to at least one input buffer input, and at least one output buffer output. The output of input buffer may be coupled to a programmable MUX circuit, while the input to output buffer may be coupled to a circuit of the 3D device. One or more buffers and programmable MUXs may be configurable to achieve a high impedance state (AKA tri-state). The buffers & MUXs may be configured by configuration memory as well as internal and external control signals, the external signals received thru other multi-function pins. Thus outputs of the buffer are coupled in parallel with respective control signals, such that each of the shared pins receives both a control signal and an output from the buffer. Responsive to a control signal, the outputs of the buffer are disabled (i.e, tri-stated) such that external configuration data (Ex. from a Boot-ROM) is read from the shared pins into one or more configuration memories (Ex. SRAM) on the chip. When the configuration is done, the pin may be coupled to other input or output of the 3D chip. In short, configuration signals may be received by a 3D chip controller responsive to a control signal (such as RESET) on the same nodes used to communicate with other devices external to the controller at other times. Consequently, the pin count of a controller using various configuration signals can be greatly reduced. In yet another embodiment, a multi-function pin is provided to handle both power and clock input. In this embodiment, a clock signal is embedded to modulate power pin within a predetermined oscillation. Clock information is subsequently extracted from the power pin inside the 3D device. In yet another embodiment, a multi-function pin is provided to handle both power and reset input. Other pin sharing arrangements can be done as well.

In yet another embodiment, the pin out of the device can be configured to optimize ground and power distribution to the chip. For example, the device can have a large ground or power area at the center of one or more input/output pins and the pin comprise a configurable means of coupling to the said areas.

Fabrication of a 3D IC according to the current teachings is described in the incorporated-by-reference disclosures. A brief description is provided here for completeness. Transistors and routing for programmable and fixed circuit elements are formed by utilizing a standard logic process flow used in an ASIC fabrication. Extra processing steps used for formation of 3D configuration memory elements are inserted into the logic flow after a specific interconnect layer is constructed. The following terms used herein are acronyms associated with certain manufacturing processes. The acronyms and their abbreviations are as follows:

$V_T$ Threshold voltage
LDN Lightly doped NMOS drain
LDP Lightly doped PMOS drain
LDD Lightly doped drain
RTA Rapid thermal annealing
Ni Nickel
Ti Titanium
TiN Titanium-Nitride
W Tungsten
S Source
D Drain
G Gate
ILD Inter layer dielectric
IMD Inter metal dielectric
C1 Contact-1
V1 Via-1
M1 Metal-1
P1 Poly-1
P− Positive light dopant (Boron species, $BF_2$)
N− Negative light dopant (Phosphorous, Arsenic)
P+ Positive high dopant (Boron species, $BF_2$)
N+ Negative high dopant (Phosphorous, Arsenic)
Gox Gate oxide
C2 Contact-2
LPCVD Low pressure chemical vapor deposition
CVD Chemical vapor deposition
ONO Oxide-nitride-oxide
LTO Low temperature oxide In the IC fabrication industry, a logic process is used to fabricate CMOS devices on a Silicon substrate layer. First, transistors are constructed on the Silicon substrate, and a plurality of metal layers is used to interconnect the transistors to form desired circuits. These circuits are accessed through pad structures that are coupled to external devices. These CMOS devices may be used to build AND gates, OR gates, inverters, LUTs, MUXs, adders, multipliers, IP blocks, memory and pass-gate based logic functions in an integrated circuit. Circuits built with logic processes are well known in the IC industry and only presented here for illustrative purposes. An exemplary logic process may include one or more of following steps:

P-type substrate starting wafer
    Shallow Trench isolation: Trench Etch, Trench Fill and CMP
    Sacrificial oxide
    PMOS $V_T$ mask & implant
    NMOS $V_T$ mask & implant
    Pwell implant mask and implant through field
    Nwell implant mask and implant through field
    Dopant activation and anneal
    Sacrificial oxide etch
    Gate oxidation/Dual gate oxide option
    Gate poly (GP) deposition
    GP mask & etch
    LDN mask & implant
    LDP mask & implant
    Spacer oxide deposition & spacer etch
    N+ mask and NMOS N+G, S, D implant
    P+ mask and PMOS P+G, S, D implant
    Ni deposition
    RTA anneal-Ni salicidation (S/D/G regions & interconnect)
    Unreacted Ni etch
    ILD oxide deposition & CMP
    Contact C1 masking and etch
    Metal M1 deposition, Metal masking and etch
    IMD oxide deposition & CMP
    Via V1 masking and etch
    A plurality of metal and via patterning to form interconnects
    Passivation oxide deposition
    Pad mask and etch Such a logic process forms one layer of transistors on a substrate. Such a logic process builds a plurality of module layers as defined in this disclosure. A first module layer may be a patterned single metal layer. A second module layer may include all the processing steps from the beginning to including ILD oxide deposition & CMP step. Integrated circuits constructed with a logic process are defined herein as 2D ICs. A CMOSFET thin-film-transistor (TFT) module layer or a Complementary gated FET (CGated-FET) TFT module layer may be inserted to a logic process at various points throughout the logic fabrication process to build 3D ICs. In a first embodiment, the TFT process may be added after C1 processing, prior to M1 processing. In a second embodiment the TFT process may be inserted to logic process after Vn processing prior to M(n+1) processing. In yet another embodiment the TFT process may be inserted after the top metal is deposited. All or some of configuration circuitry may be built with the TFT transistors above the logic transistors. An exemplary TFT process may include one or more following steps:

Contact mask & etch
    W-Silicide (or Al) plug fill & CMP
    Amorphous P1 (poly-1) deposition
    P1 mask & etch
    Vtn mask & P− implant (NMOS Vt)
    Vtp mask & N− implant (PMOS Vt)
    TFT Gox (70 A to 200 A PECVD) deposition
    Amorphous P2 (poly-2) deposition
    N+ mask & implant (NMOS Gate & interconnect)
    P+ mask & implant (PMOS Gate & interconnect)
    Hard mask oxide deposition
    P2 mask & etch
    LDN mask & NMOS S/D N− tip implant
    LDP mask & PMOS S/D P− tip implant
    Spacer LTO or Plasma Nitride deposition
    Spacer LTO etch & clean to form spacers & expose P1 & P2
    Ni deposition
    RTA salicidation and anneal (G/S/D regions & interconnect)
    Excess Ni etch
    Dopant activation anneal
    ILD oxide deposition & CMP
    Contact mask & etch
    W plug formation & CMP
    Metal deposition & etch The TFT process technology consists of creating NMOS & PMOS amorphous-silicon or poly-silicon transistors above single crystal NMOS & PMOS devices. These amorphous Silicon transistors may be annealed by various techniques available in the processing industry, such as laser crystallization, to improve the mobility and transistor characteristics of TFT. Thus a second layer of transistors may be fabricated substantially above a first layer of transistors to increase the transistor density available in a unit area of Silicon. In a preferred embodiment, the second layer of TFT transistors may be used to construct an array of memory cells to program randomly positioned programmable elements on a silicon substrate transistor first layer.

As the discussions demonstrate, memory controlled pass transistor logic elements provide a powerful tool to make switches. Such switches are commonly encountered in PLD and FPGA devices. The high cost of configuration memory can be drastically reduced by the 3-dimensional integration of configuration elements and the replaceable modularity concept for said memory disclosed in current and incorporated-by-reference disclosures. These advances allow design of highly economical, more reliable, lower dissipation power, higher performance, higher level of integration and easily convertible to ASIC, FPGA devices. In one aspect, a cheaper memory element allows use of more memory for programmability. That enhances the ability to build large logic blocks (i.e. course-grain advantage) while maintaining smaller element logic fitting (i.e. fine-grain advantage). Furthermore larger grains need less connectivity: neighboring cells and far-away cells. That further simplifies the interconnect structure. Thus better programmable logic and better programmable interconnect is realized with 3D programmable architectures.

A 3-dimensional SRAM process integration reduces the cost of re-programmability for these interconnect structures. Similarly, any other 3-dimensional memory technology will offer the same cost advantage. Such a 3D technology may be programmable fuse links, where the programming is achieved by a laser gun. It could be achieved by magnetic memory or ferro-electric memory. A method is also shown to map programmable elements to an application specific hard-wire elements, wherein the wire delays are unaffected by the change. The conversion allows a further cost reduction to the user, thus providing an alternative technique in designing an ASIC thru an original FPGA device, and to reach FPGA logic densities approaching ASIC logic densities.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. On a metal layer, a metal pattern software tool, the metal pattern comprising:
   a first group of metal lines capable of coupling to a first voltage;
   a second group of metal lines capable of coupling to a second voltage;
   a set of fixed metal tabs at predetermined positions;
   a first subset of metal tabs selected from a first set of selectable metal tabs at predetermined positions, each first set of selectable metal tabs coupling one of said fixed metal tabs to one of said first group of metal lines; and
   a second subset of metal tabs selected from a second set of selectable metal tabs at predetermined positions, each second set of selectable metal tabs coupling one of said fixed metal tabs to one of said second group of metal lines;
   wherein a fixed metal tab is coupled to one of said first or second group of metal lines through a selectable metal tab from said first or second set of selectable metal tabs based on a binary data set, wherein each data point in the binary data set is uniquely matched to one of said set of fixed metal tabs.

2. The pattern of claim 1, wherein a said fixed metal tab overlaps a via connection to an underneath metal layer.

3. The pattern of claim 1, wherein a said fixed metal tab is coupled to one of said first and second voltages.

4. The pattern of claim 1, wherein the fixed metal tabs coupling to a non functional integrated circuit at the fixed metal tabs to make the integrated circuit fully functional according to a customer specification.

5. The pattern of claim 4, wherein the binary data set is extracted by a computer based on a placement and routing result of the customer specification on a software model of the integrated circuit.

6. The pattern of claim 1, further comprising a set of predetermined metal pads.

7. The pattern of claim 1, further comprising metal lines to carry one or more of power, ground and any other signal.

8. The pattern of claim 1, wherein the fixed metal tabs coupling to a non programmed programmable logic circuit included in an integrated circuit, the programmable logic circuit configured by the metal pattern according to a customer specification.

9. A method for defining a metal pattern for an integrated circuit, comprising:
   positioning fixed metal tabs at predetermined positions; and
   positioning fixed metal lines at predetermined positions, a first portion of the metal lines capable of coupling to a first voltage and a second portion of the metal lines capable of coupling to a second voltage; and
   positioning selectable metal tabs, a first portion of selectable tabs coupling the fixed metal tabs to the first portion of metal lines, and the second portion of metal tabs coupling the fixed metal tabs to the second portion of metal lines, wherein each said fixed metal tab has selectable metal tabs to couple it to said first voltage and said second voltage; and
   selecting a subset of the selectable metal tabs with a computer by:
      reading a binary data set, each data point in the set uniquely matched to a said fixed metal tab; and
      selecting a first or second portion of selectable metal tabs based on a first or second data value respectively for each said fixed metal tab, whereby each said fixed metal tab is either coupled to said first voltage or said second voltage by the selected metal tab.

10. The method of claim 9, whereby the metal pattern is used to fabricate an integrated circuit.

11. The method of claim 10, wherein the binary data set is extracted by a software tool based on a placement and routing result of a user design on a software model of the integrated circuit.

12. The method of claim 9, whereby each said fixed metal tab is coupled to a via further coupled to an underneath metal layer.

13. The method of claim 9, comprising positioning fixed metal pads at predetermined positions.

14. The method of claim 9, comprising positioning fixed metal lines to carry one or more of power, ground and signal lines at predetermined positions.

15. The method of claim 9, wherein each binary data set defines a unique metal pattern.

16. The method of claim 9, whereby the fixed metal tabs couple to a programmable logic circuit to configure the logic circuit by the selected metal tabs to a user specification.

17. An integrated circuit device fabricated by a mask set including a mask to generate a metal pattern defined by computer aided design (CAD) software, the circuit comprising:
   a plurality of circuit blocks including a programmable logic block;
   a plurality of via nodes coupled to the programmable logic block to program the logic block; and
   a metal pattern comprising:
      a plurality of fixed metal tabs, each fixed tab covering one of said plurality of via nodes for coupling;
      a first subset of metal tabs selected from a first set of metal tabs at predetermined positions, each first set metal tab coupling one of said plurality of fixed metal tabs to a first voltage; and
      a second subset of metal tabs selected from a second set of metal tabs at predetermined positions, each second set metal tab coupling one of said plurality of fixed metal tabs to a second voltage;
      wherein a via node corresponding to a fixed metal tab is coupled to one of said first or second set of metal tabs based on a binary data set, wherein each data point in the binary data set is uniquely matched to one of said plurality of via nodes.

18. The device in claim 17, wherein the metal pattern further comprises fixed metal lines at predetermined positions to carry one or more of power, ground, first voltage, second voltage and signal lines.

19. The device of claim 17, wherein the binary data set is extracted by a software tool based on a placement and routing result of a user design on a software model of the programmable logic circuit.

20. The device in claim 17, comprising a plurality of pads, a said pad coupled to a system.

* * * * *

UNITED STATES PATENT AND TRADEMARK OFFICE
CERTIFICATE OF CORRECTION

| | | |
|---|---|---|
| PATENT NO. | : 8,230,375 B2 | Page 1 of 1 |
| APPLICATION NO. | : 12/210212 | |
| DATED | : July 24, 2012 | |
| INVENTOR(S) | : Madurawe | |

It is certified that error appears in the above-identified patent and that said Letters Patent is hereby corrected as shown below:

On the Title Page, below item (76), in Column 1, insert -- (73) Assignee: Yakimishu Co. Ltd., LLC, Dover, DE (US) --.

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,230,375 B2 |
| APPLICATION NO. | : 12/210212 |
| DATED | : July 24, 2012 |
| INVENTOR(S) | : Madurawe |

It is certified that error appears in the above-identified patent and that said Letters Patent is hereby corrected as shown below:

On the Title Page, in Column 1, Line 3, delete "(76)" and insert -- (75) --, therefor.

In Column 4, Line 27, delete "one time" and insert -- one-time --, therefor.

In Column 7, Line 65, delete "(TFT)," and insert -- (TFTs), --, therefor.

In Column 10, Line 44, delete "Further more" and insert -- Furthermore --, therefor.

In Column 10, Line 57, delete "I/P" and insert -- IP --, therefor.

In Column 13, Line 24, delete "then" and insert -- than --, therefor.

In Column 15, Line 5, delete "DESCRIPTION" and insert -- DETAILED DESCRIPTION --, therefor.

In Column 22, Line 20, delete "SRM" and insert -- SRAM --, therefor.

In Column 28, Line 18, delete "thru" and insert -- through --, therefor.

In Column 28, Line 47, delete "thru" and insert -- through --, therefor.

In Column 33, Line 29, delete "(1303a 3)" and insert -- (1303a_3) --, therefor.

In Column 33, Line 61, delete "thru" and insert -- through --, therefor.

In Column 33, Line 66, delete "(i.e," and insert -- (i.e., --, therefor.

In Column 34, Line 60, delete "oxide" and insert -- oxide. --, therefor.

In Column 35, Line 37, delete "etch" and insert -- etch. --, therefor.

In Column 36, Line 15, delete "etch" and insert -- etch. --, therefor.

In Column 36, Line 60, delete "thru" and insert -- through --, therefor.

Signed and Sealed this
Nineteenth Day of February, 2013

Teresa Stanek Rea
*Acting Director of the United States Patent and Trademark Office*